United States Patent [19]

Katta et al.

[11] Patent Number: 5,706,346
[45] Date of Patent: Jan. 6, 1998

[54] SCRAMBLING APPARATUS AND DESCRAMBLING APPARATUS

[75] Inventors: Noboru Katta, Itami; Hiroki Murakami, Osaka; Susumu Ibaraki, Toyonaka; Seiji Nakamura, Toyonaka, all of Japan

[73] Assignee: Matsushita Electric Industrial Co., Ltd., Osaka, Japan

[21] Appl. No.: 321,757

[22] Filed: Oct. 12, 1994

[30] Foreign Application Priority Data

| Oct. 12, 1993 | [JP] | Japan | 5-254181 |
| Oct. 14, 1993 | [JP] | Japan | 5-256772 |
| Jun. 8, 1994 | [JP] | Japan | 6-151694 |

[51] Int. Cl.$^6$ ............................... H04N 7/167
[52] U.S. Cl. ......................... 380/10; 380/6; 380/7; 380/9; 380/49
[58] Field of Search ........................ 380/3, 4, 5, 6, 380/7, 9, 10, 20, 49

[56] References Cited

U.S. PATENT DOCUMENTS

| 4,390,898 | 6/1983 | Bond et al. | 380/20 X |
| 4,742,544 | 5/1988 | Kupnicki et al. | 380/20 X |
| 4,918,523 | 4/1990 | Simon et al. | |
| 5,285,497 | 2/1994 | Thatcher, Jr. | 380/49 |

FOREIGN PATENT DOCUMENTS

| 0 582 122 | 2/1994 | European Pat. Off. | H04N 7/167 |

OTHER PUBLICATIONS

IEEE Transactions on Consumer Electronics, vol. 38, No. 3, Aug. 1992, pp. 188–194, D. Angebaud et al., "Conditional Access mechanisms for all–Digital Broadcast Signals".
Symposium Record Broadcast Sessions, Jun. 15, 1993, pp. 671–676, Dr. J. Tydeman, "Who Wants Digital?".
"A Scrambling System —M— for Communication Satellite Television" by Toshikazu Nezu et al., ITEJ Technical Report, vol. 15 No. 14, Feb. 1991.
MPEG–1 Information Technology—Coding of Moving Pictures and Associated Audio for Digital Storage Media at up to about 1,5Mbit/s, Aug. 1, 1993, Part 2, ISO/IEC 11172-2.
MPEG–2, Information Technology—Generic Coding of Moving Pictures and Associated Audio Recommendation H.262, Nov. 1993, ISO/IEC JTC1/SC29.

Primary Examiner—Bernarr E. Gregory
Attorney, Agent, or Firm—Wenderoth, Lind & Ponack

[57] ABSTRACT

A scrambling apparatus has at least one of the following processing units: a signal inserting processor for inserting a dummy pattern indicating the quantization width in the compressed video data; a conversion processor for scrambling a signal specifying whether field or frame processing is used; a DCT coefficient conversion processor for scrambling a part of the code defining the DCT coefficient; an intra_dc_precision conversion processor for scrambling the intra_dc_precision signal; and an alternate_scan conversion processor for scrambling the alternate _scan signal. A descrambling apparatus reverses the conversion process on the video data scrambled by the scrambling apparatus to restore the video data to the original unscrambled state.

38 Claims, 12 Drawing Sheets

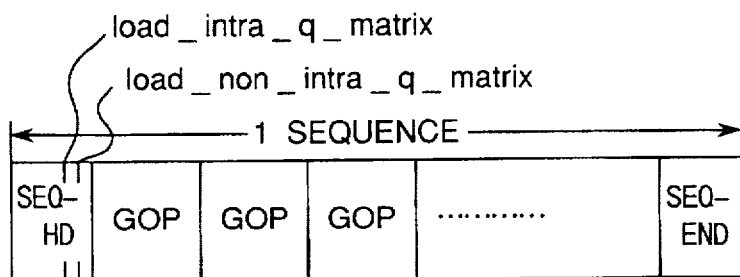
*Fig.2A*
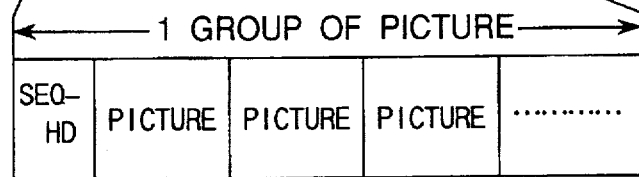
*Fig.2B*
*Fig.2C*
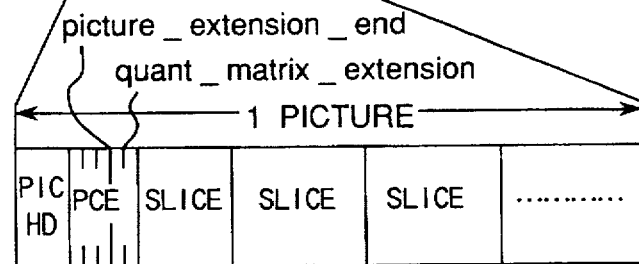
*Fig.2D*
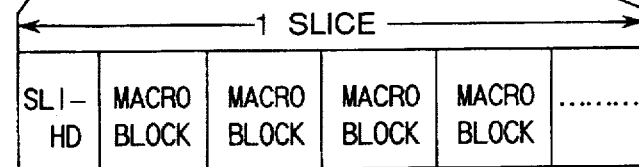
*Fig.2E*
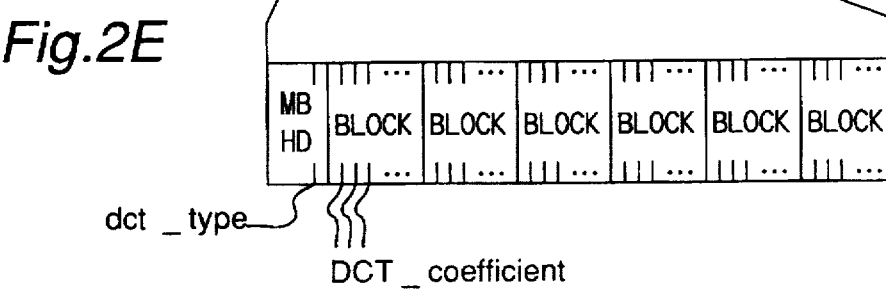

dct_type ··· "1"

dct_type ··· "0"

Fig.4A
sm2—1 (000001)

| 1 | 255 | 1 | 1 | 1 | 1 | 1 | 1 |
|---|-----|---|---|---|---|---|---|
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |

Fig.4B
sm2—2 (000010)

| 1 | 1 | 1 | 1 | 1 | 1 | 1 | 1 |
|---|---|---|---|---|---|---|---|
| 255 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |

Fig.4C
sm2—3 (000100)

| 1 | 1 | 255 | 1 | 1 | 1 | 1 | 1 |
|---|---|-----|---|---|---|---|---|
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |

Fig.4D
sm2—4 (001000)

| 1 | 1 | 1 | 1 | 1 | 1 | 1 | 1 |
|---|---|---|---|---|---|---|---|
| 1 | 1 | 1 | 1 | 1 | 1 | 1 | 1 |
| 255 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |

Fig.4E
sm2—5 (010000)

| 1 | 255 | 1 | 1 | 1 | 1 | 1 | 1 |
|---|-----|---|---|---|---|---|---|
| 255 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |

Fig.4F
sm2—6 (100000)

| 8 | 1 | 1 | 1 | 1 | 1 | 1 | 1 |
|---|---|---|---|---|---|---|---|
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |

Fig.5

|  | NUMBER OF BITS |
|---|---|
| Ks | 32 |
| sm1 | 5 |
| sm2 | 6 |
| sequence_intra | 1 |
| sequence_non_intra | 1 |
| while(next_bit==1) | |
| { | |
| load_q_mat | 1 |
| q_mat_temporal_reference | 10 |
| } | |
| end_code | 1 | and effect control is thus not possible.

SCRAMBLING APPARATUS AND DESCRAMBLING APPARATUS

BACKGROUND OF THE INVENTION

1. Field of the Invention

The present invention relates to a system for limiting access to transmitted or stored digitized signals by scrambling the digitized signal and providing the descrambling procedure to authorized devices only. More specifically, the invention relates to an effects control scrambling apparatus for controlling the degree of scrambling according to the objective; a descrambling apparatus for reproducing the scrambled signal; and a scrambled transmission apparatus comprising this scrambling apparatus and descrambling apparatus.

2. Description of the Prior Art

Signal scrambling is commonly used today for enhanced security in pay-TV broadcasts and similar applications. Digital signal scrambling devices such as described in Vol. 15, No. 14, pp. 1–6 of the Technical Report of the Institute of Television Engineers of Japan (ITEJ) are used to scramble the audio signal.

This conventional scrambling apparatus comprises an exclusive-OR device for adding a random number to the input signal; a random number generator for generating a random number according to the scrambling key; and a control circuit for controlling the number of random numbers applied to the input signal, and placed between the random number generator and the exclusive-OR device.

With this conventional apparatus, the input signal is converted to a scrambled signal by bit inversion using a pseudo-random number generated according to the scrambling key by a pseudo-random number generator, and by an exclusive-OR operation by the exclusive-OR device. The degree of input signal bit inversion is controlled at this time by the control circuit adding or not adding the random numbers to the input signal at an appropriate ratio. During descrambling, the scrambled signal can be descrambled by reapplying an exclusive-OR operation to the scrambled signal using the random number from the random number generator, but the pseudo-random number generated by the random number generator is determined by the scrambling key, and descrambling is only possible if the scrambling key is known.

When the input signal is fixed-length coded with a conventional scrambling apparatus and descrambling apparatus, the position and length of each code is known even if random data bits are inverted. As a result, codes without a random number can still be correctly reproduced even without descrambling, and the amount that can be reproduced without the scrambling key can be controlled by varying the ratio at which the random number is added.

However, because random bit inversion is applied to the scrambled signal with this conventional apparatus, when the input signal contains variable length code, even the random length code becomes converted to a random bit pattern by the scrambling process. In codes resulting from variable length coding, the code length is not constant, and not all possible bit patterns that can be expressed with each code length are stored in the code book. As a result, even if only several bits are inverted in the code, non-reproducible code that is not in the code book may result; the code may be interpreted as a separate code of a different code length, causing the starting point of the next code to be mistaken, thus preventing reproduction of all subsequent data; and effect control is thus not possible.

In addition, when the input signal is compressed data, the data is often converted to plural parameters and coded, the size affected when the data is expanded differs with each parameter, and sufficient effect control is not possible when scrambling is indiscriminately applied.

SUMMARY OF THE INVENTION

Therefore, an object of the present invention is to provide a scrambling apparatus for controlling the scrambling effect to such a degree that descrambling and reproduction by unauthorized parties is not completely disabled, but is disabled to the extent that the content of unauthorized reproduction data is partially but not completely discernible. A further object of the invention is to provide a descrambling apparatus for descrambling and reproducing the data scrambled by the scrambling apparatus of the invention.

According to a preferred embodiment of the present invention, a scrambling system comprises a scrambling apparatus and a descrambling apparatus for scrambling and descrambling a compression-coded digital video signal. The scrambling apparatus comprises: detecting means for detecting a predetermined position in said compression-coded digital video signal; dummy generation means for generating a dummy data; and insertion means for inserting said dummy data at said predetermined position in said compression-coded digital video signal. The descrambling apparatus comprises: dummy detection means for detecting said dummy data inserted in said compression-coded digital video signal; and removing means for removing the detected dummy data from said compression-coded digital video signal.

It is to be noted that the present invention comprises both the scrambling apparatus and the descrambling apparatus, and the transmission data is a compression coded digital video signal.

A first embodiment of the present invention is a scrambling apparatus comprising a dummy signal insertion processor for inserting a dummy signal indicating the quantization width in the compression coded digital video signal.

By the above configuration, the video data is inserted with a dummy signal defining a quantization width different from the quantization width of the quantization process used during normal coding. When the video data is descrambled without deleting this signal, the reproduction level will be haphazard, and the content of the video data will be a scrambled signal unsuitable to viewing. In addition, when the video data is orthogonal transform coded and the quantization width is indicated for each coefficient component, more precise control can be achieved by inserting the pattern controlling the quantization width for each coefficient.

In particular, by inserting a code indicating a smaller value than the value of the quantization width used during actual coding as the code indicating the quantization width of the coefficient identifying the AC component in the orthogonal transform coded video data, the AC component becomes a controlling factor in the reproduction of each orthogonal transform coded block, and a mosaic scrambled image of the size of the orthogonal transform coded block is obtained. If the quantization width of a specific coefficient component is a value greater than the quantization width actually used for coding, a scrambled image in which only specific signal components are emphasized will be obtained; if the signal of the emphasized coefficient is converted to the luminance signal, and this value is emphasized to a level greater than the dynamic range of the luminance level, the scrambled image will be a mosaic of the size of the width of that specific pattern.

A scrambling unit for scrambling part of the coefficient component in the orthogonal transform coded video signal is also provided. By the signal insertion processor converting the signal indicating the quantization width of the coefficient scrambled by the scrambling unit to a value smaller than the value used for coding, or by inserting a pattern indicating such a value, the effect of reproducing the scrambled signal on the scrambled image can be decreased, and a scrambled image equivalent to an image reproduced using data from which the scrambled signal has been removed can be obtained rather than an image in which the scrambled components are reproduced as random values. In other words, it is possible to prevent reproduction of difficult-to-view images as occurs when data randomized by this scrambling process is reproduced. In addition, because the result of this scrambling process has virtually no affect on the scrambled image, it is difficult to predict the content of the scrambling process by simply examining the scrambled signal, and greater protection against unauthorized decoding can be achieved. Furthermore, when the value of the signal determining the quantization width of the coefficient signal of the DC components in each coefficient component after orthogonal transformation in the orthogonal transform coded video data is greater than the value actually used for coding, a scrambled image with an emphasized DC component results; when the reproduction level is emphasized to a level greater than the dynamic range, the scrambled image even appears to have been digitized.

In a second embodiment of the invention, the video signal may be processed by either field unit or frame unit, and the scrambling unit controls scrambling of a signal identifying whether the orthogonal transform coded video signal was frame or field processed.

The scrambling effect obtained with this configuration will cause the fields in field processed images to be descrambled as frames, and the frames in frame processed imaged to be descrambled as fields in illegally descrambled scrambled images. By thus descrambling the fields and frames in the wrong positions, the basic content of the video will be discernible but detail will be indiscernible. Furthermore, in video data conforming to the international standard for motion picture coding (the MPEG of the ISO/IEC), the mosaic width of the video produced by the inserted code will be doubled in the vertical direction, resulting in a mosaic scrambled image of 16 pixels vertically and 8 pixels horizontally in MPEG standard video data; this is possible by disordering the dct_type signal in the MPEG-standard signal, and by combining a process inserting a code indicating a value smaller than the actual value of the quantization width when coding the code indicating the quantization width of the coefficient for the DC component in the orthogonal transform coded video data.

The third embodiment of the invention further comprises a means for bit inversion processing the alternate_scan signal in an MPEG-standard signal.

This alternate_scan signal is a code defining the scanning method when the DCT coefficient is coded by two-dimensional Huffman coding. By bit inverting the alternate_scan signal in the input signal, and thus inverting this code, when the two-dimensional Huffman code is reproduced, each coefficient component is reproduced as a coefficient component different from the actual component, and the net effect as similar to substitution on the frequency base.

The descrambling apparatus of the invention is a means for descrambling and correctly reproducing the data of the scrambled signal generated by the scrambling apparatuses described above.

The scrambled transmission apparatus of the invention comprises a scrambling apparatus and descrambling apparatus of the invention.

BRIEF DESCRIPTION OF THE DRAWINGS

The present invention will become more fully understood from the detailed description given below and the accompanying diagrams wherein:

FIGS. 2A, 2B, 2C, 2D, 2E and 2F are signal format diagrams used to describe the structure of video data conforming to the MPEG standard;

FIGS. 4A, 4B, 4C, 4D, 4E and 4F are diagrams showing various correlation map of dummy data for the quantization matrix insertion patterns;

FIG. 5 is a table showing the number of bits in the scramble information in the preferred embodiment;

DESCRIPTION OF PREFERRED EMBODIMENTS

Figure 1A:
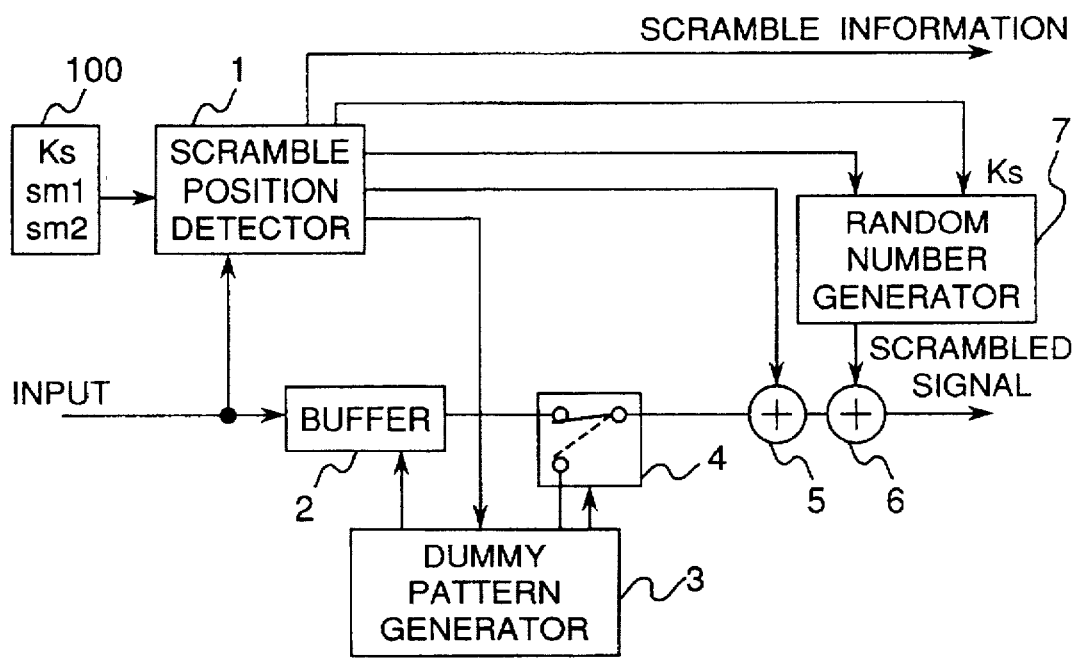
FIGS. 1A and 1B are block diagrams of a scrambling apparatus and a descrambling apparatus, respectively, according to the preferred embodiment of the invention.

Before the description of the present invention proceeds, the concept of a video signal conforming to the Moving Picture Expert Group (MPEG) standards will be explained with reference to FIG. 2. The MPEG standards include ISO/IEC CD 13818 (a committed draft of the ISO/IEC; commonly known as MPEG-2), and ISO/IEC 11172 (an international standard of ISO/IEC; commonly known as MPEG-1).

The data structure comprises sequence layers, each sequence layer expressing one moving picture sequence.

As shown in FIG. 2A, each sequence comprises a sequence header, which includes the sequence starting code, various parameters, and data, and the coded data for one or more group-of-pictures (GOP). In the sequence header, the following two signals:

'load_intra_quantizer_matrix' signal (one bit),

'load_non_intra_quantizer_matrix' signal (one bit) are included and will be used in the present invention. When the 'load_intra_quantizer_matrix' signal is '1', that is a HIGH level signal, it is indicated that an intra quantized matrix data (8×8×8=512 bit data) will follow immediately after the 'load_intra_quantizer_matrix' signal, and when it is '0', that is a LOW level signal, it is indicated that no data will follow immediately after the 'load_intra_quantizer_matrix' signal. The same can be said to the 'load_non_intra_quantizer_matrix' signal.

As shown in FIG. 2B, each GOP layer within the sequence comprises frames of any desired length, each frame comprising a header containing the GOP start code, and the coded data of one or more pictures.

As shown in FIG. 2C, each picture layer within the GOP layer comprises a picture header containing the picture start code, a picture coding extension (PCE), extensions and user data and the coded data of one or more slices. In the area between the picture header and the first slice, the following information:

'intra_dc_precision' signal (two bit),

'alternate_scan' signal (one bit),

'picture_extension_end' timing

'quant_matrix_extension' data (maximum 2088 bits) are included and will be used in the present invention. When the 'picture_extension_end' timing signal is produced, it is understood that the picture_coding_extension is terminated. After the picture_coding_extension, it is possible to insert a dummy data where the plural quantized matrix data (the maximum bit length will be 8×8×8×4+4+4+32=2088 bits data) may be placed.

As shown in FIG. 2D, each slice layer comprises a slice header containing the slice start code, and the coded data of one or more macro blocks; any number of macro blocks may be included, each macro block covering the data for a 16×16 pixel area.

As shown in FIG. 2E, each macro block comprises macro block header and a plurality of blocks. Four basic coding blocks for luminance data, and a number of basic coding blocks for the color difference data. Each block has a size 8×8 and is the coded conversion coefficient of the DCT converted block unit, and most coefficients are 2D Huffman coded using a specific scanning direction and level value. DCT conversion processing is executed in block units using either field processing or frame processing. depending on how each block is isolated within the macro block. In the macro block header, the following signal:

'dct_type' signal (one bit)

is included, and in each block, a number of the following signal:

'DCT_coefficient' signal (one bit)

is included. These two signals will be used in the present invention.

Figure 3A:
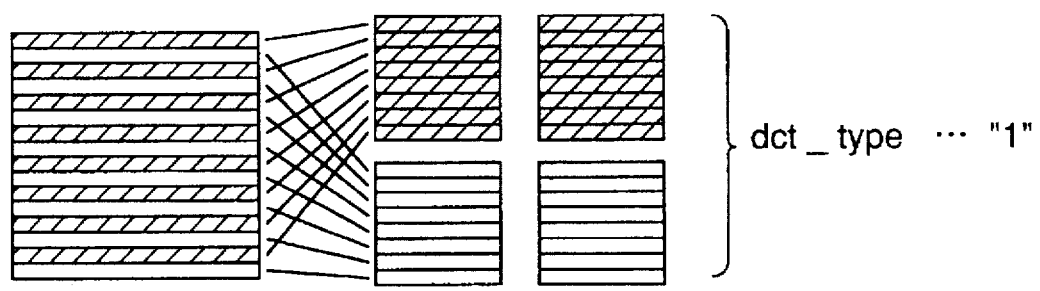
FIGS. 3A and 3B are diagrams used to describe the block structure of the macro blocks in field and frame processing of video data conforming to the MPEG standard.
Figure 3B:
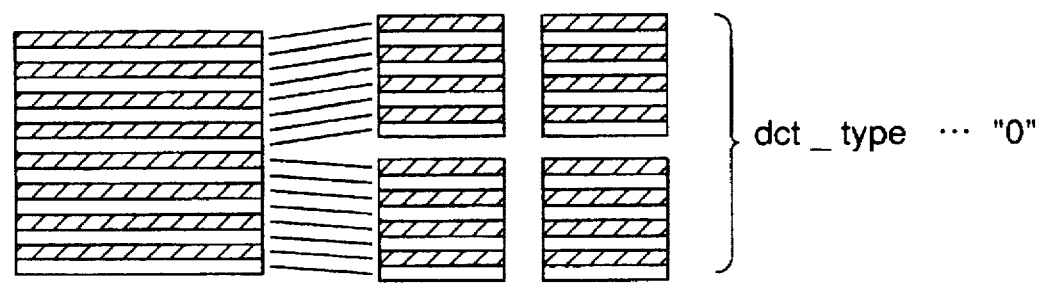

FIGS. 3A and 3B illustrate the difference in the block structure in each macro block when field processing and frame processing are used. As shown in FIG. 3A, with field processing, pixels belonging to the same field are grouped in the vertical direction to form blocks. As shown in FIG. 3B, with frame processing, spatially adjacent pixels are grouped to form blocks. DCT conversion coding is then applied to the resulting blocks. As a result, field/frame processing selection is performed by macro block unit, and the descrambling/reproducing side can determine whether field or frame processing was used by reading the one-bit dct_type signal in each macro block.

The quantization matrix signal is in the sequence header. There is also a one-bit signal at bit 63 following the sequence start code called the 'load_intra_quantizer_matrix' signal indicating the presence of an 'intra_quantizer_matrix'. When this bit is '1' the intra_quantizer_matrix, i.e., the quantization matrix used in the intra-picture, exists, using eight bits for each coefficient component, and thus having a data size of 18×64 bits (512 bit).

Similarly, 'non_intra_quantizer_matrix' signal is followed by a one-bit signal called the 'load_non_intra_quantizer_matrix' signal. The 'load_non_intra_quantizer_matrix' signal indicates the presence and absence of a 'non_intra_quantizer_matrix'. When this bit is '1' the non_intra_quantizer_matrix, i.e., the quantization matrix used outside the picture, exist as a similar 8×64 bit (512 bit) signal. In the 'quant_matrix_extension' extension area insertable to each picture, 8×64 bit 'load_intra_quantizer_matrix', 'non_intra_quantizer_matrix', 'chroma_intra_quantizer_matrix', and 'chroma_non_intra_quantizer_matrix' signals also exist. The alternate_scan signal is a signal indicating the scanning method when the conversion coefficient of the block is 2D Huffman coded, and is present as a one-bit code in the 'picture_coding_extension'. The two-bit 'intra_dc precision' code in the 'picture_coding_extension' is the signal indicating the quantization width of the DC component.

It is to be noted that the input signal is assumed below to be video signal conforming to a Moving Picture Expert Group (MPEG) standard.

Figure 1B:
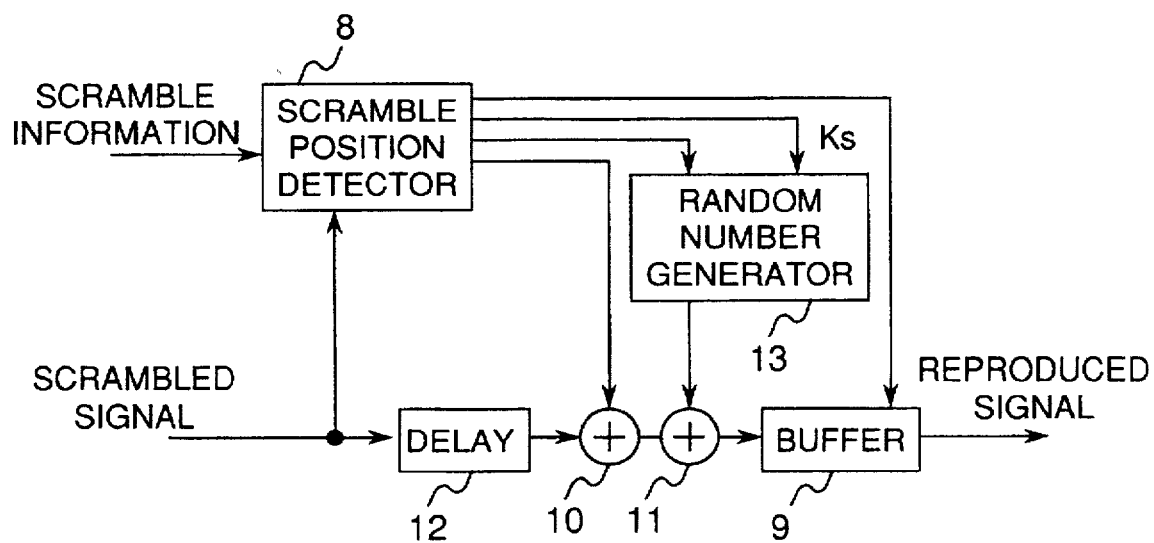

Referring to FIGS. 1A and 1B block diagrams of a scrambled transmission apparatus according to the preferred embodiment of the invention are shown. FIG. 1A shows the signal processing apparatus (the scrambling apparatus below) for generating the scrambled signal, and FIG. 1B shows the signal processing apparatus (the descrambling apparatus below) for descrambling and reproducing the scrambled signal generated by the signal apparatus shown in FIG. 1A.

Scrambling Apparatus

As shown in FIG. 1A, the scrambling apparatus generally comprise: a scramble position detector 1 for detecting the position to be processed in the input signal; a buffer 2 for temporarily storing and then outputting the data at the appropriate timing; exclusive-OR gates 5 and 6; and random number generator 7.

Figure 9A:
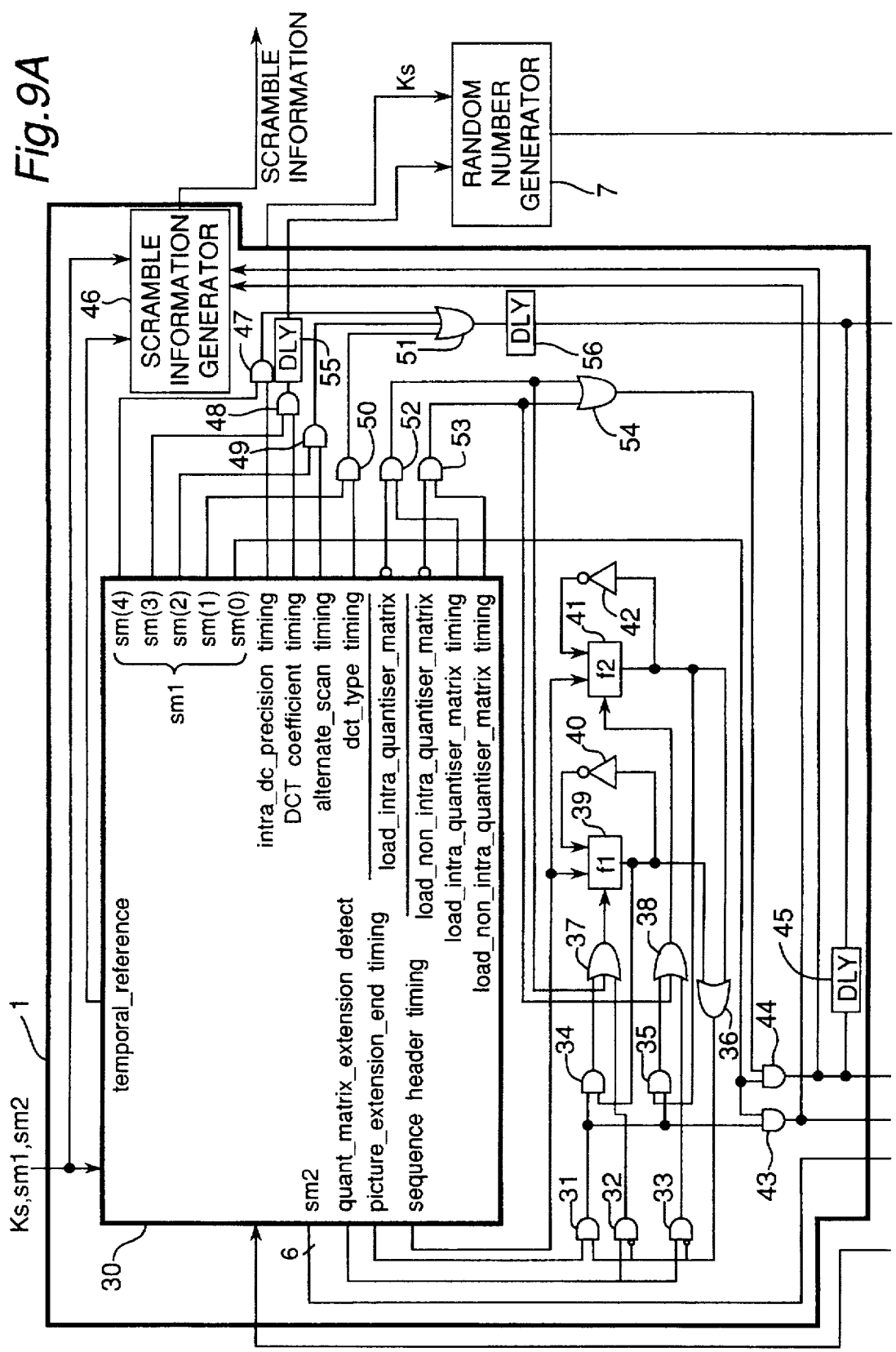
FIGS. 9A and 9B, taken together as shown in FIG. 9, show a detail of the scrambling apparatus shown in FIG. 1A.
Figure 9B:
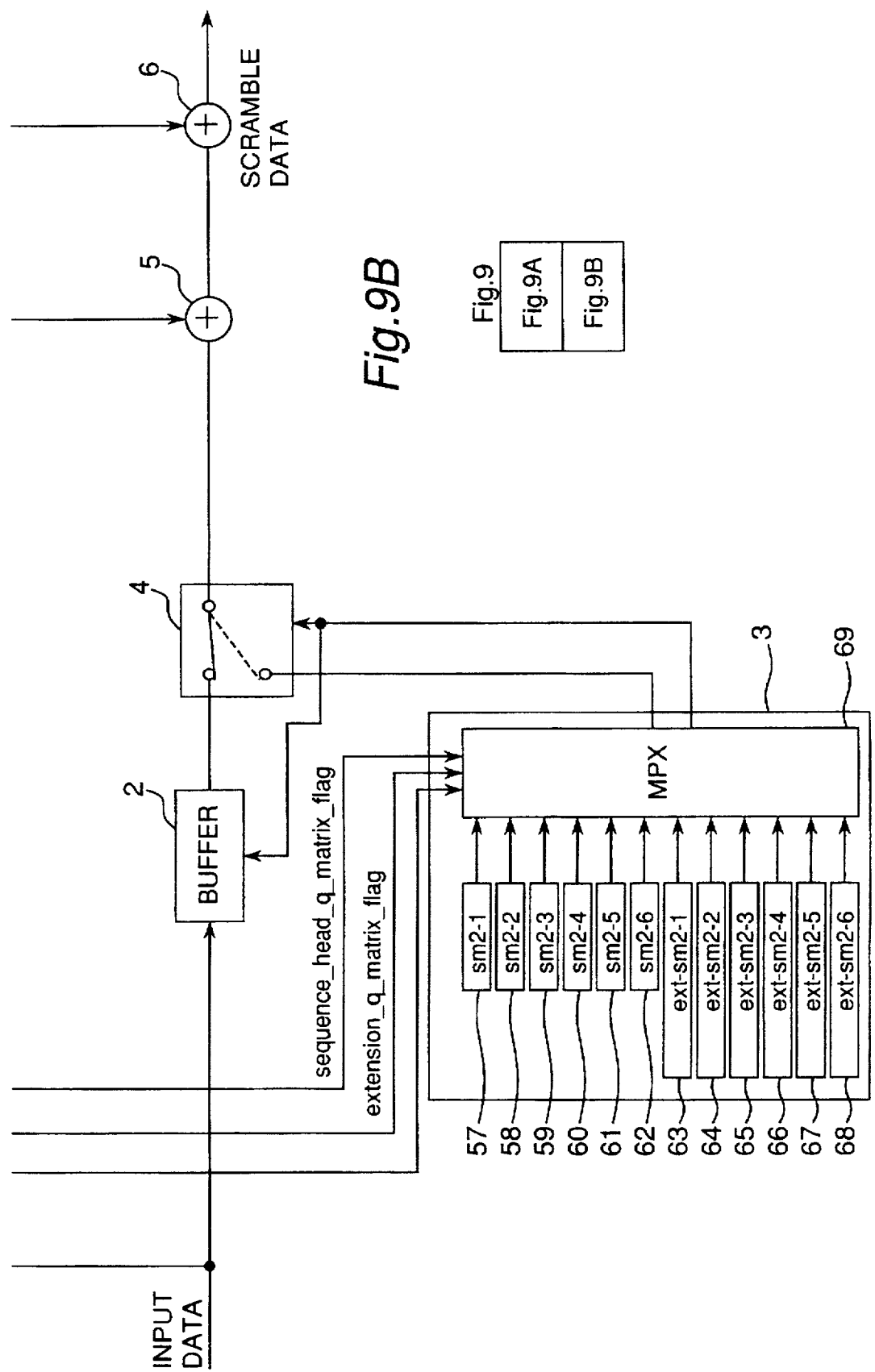

The scrambling apparatus further comprises a scramble data generator 100, a dummy pattern generator 3 for outputting a bit pattern of a dummy quantization matrix code; and a switch 4, normally in the real line position in FIG. 9B, for outputting the signal from either the buffer 2 or the dummy pattern generator 3. A further detail of the scrambling apparatus is shown in FIGS. 9A and 9B, taken together as shown in FIG. 9.

As shown in FIG. 9A, the scramble position detector 1 comprises a signal detector 30 for detecting various signals in the MPEG video signal. The signal detector 30 receives MPEG video signal, such as shown in FIGS. 2A–2E, as an input data and also scramble data for effecting the scrambling from the scramble data generator 100. The scramble data includes key data Ks for selecting a number for the random number generator 7, a five-bit scramble mode signal sm1, and six-bit scramble pattern signal sm2.

The scramble mode signal sm1 is used for selecting one or more of five different scrambling modes of the present invention.

The least-significant-bit (LSB) of scramble mode signal sm1 defines the quantization matrix scrambling; bit 2, the dct_type code scrambling; bit 3, the alternate scan code scrambling; bit 4, the DCT coefficient code scrambling; and bit 5, the intra_dc_precision code scrambling.

Each bit is set to '1' when the corresponding process is executed, and is otherwise set to '0'. Thus, when the scramble mode signal sm1 is 00001, it is indicated that only the quantization matrix scrambling is effected. But, when the scramble mode signal is 00011, it is indicated that the quantization matrix scrambling and the dct_type code scrambling are effected. Also, when the scramble mode signal is 11111, it is indicated that all five scramblings are effected. The five-bit scramble mode signal sm1 from the scramble data generator 100 is applied to the signal detector 30 and outputted parallelly from five terminals sm1(4), sm1(3), sm1(2), sm1(1) and sm1(0), in which sm1(0) receives the LSB signal.

Scramble pattern signal sm2 defines a dummy pattern for the quantization matrix code. The scramble pattern signal sm2 is a six-bit signal representing six different dummy patterns of the quantization matrices, as shown in FIGS. 4A–4F.

When the scramble pattern signal sm2-1, which is '000001', is received, a dummy pattern shown in FIG. 4A will be used, in which only the line 1, column 2 component is 255, and all other components are 1. When the dummy pattern of FIG. 4A is used, the line 1, column 2 component of the DCT coefficient is maximally emphasized, and all of the components are reproduced at the minimum level.

When the scramble pattern signal is sm2-2, which is '000010', is received, a dummy pattern shown in FIG. 4B will be used. In this case, the line 2, column 1 component is maximally emphasized, and all other components are reproduced at the minimum level.

When the scramble pattern signal is sm2-3, which is '000100', is received, a dummy pattern shown in FIG. 4C will be used. In this case, only the line 1, column 3 component is maximally emphasized, and all other components are reproduced at the minimum level.

When the scramble pattern signal is sm2-4, which is '001000', is received, a dummy pattern shown in FIG. 4D will be used. In this case, only the line 3, column 1 component is maximally emphasized.

When the scramble pattern signal is sm2-5, which is '010000', is received, a dummy pattern shown in FIG. 4E will be used. In this case, only the line 1, column 2 and line 2, column 1 components are maximally emphasized.

When the scramble pattern signal is sm2-6, which is '100000', is received, a dummy pattern shown in FIG. 4F will be used. In this case, all components other than the line 1, column 1 component are reproduced at the minimum level.

As shown in FIG. 9B, the six dummy patterns shown in FIGS. 4A–4F are stored in memories 57, 58, 59, 60, 61 and 62, respectively, each dummy pattern have a size of 512 bits.

The scramble pattern signal sm2 from the scramble data generator 100 is directed to the signal detector 30 and outputted through its terminal "sm2" and further to a multiplexer 69 in the dummy pattern generator 3. One dummy pattern selected from these memories 57–61 is taken out from the multiplexer and inserted in the video signal at a position immediately after the 'load_intra_quantizer_matrix' signal as a dummy intra quantized matrix data for the purpose of scrambling.

Another six dummy patterns (not shown) of a greater size (each pattern has 2088 bits) are stored in memories 63, 64, 65, 66, 67 and 68, which dummy patterns are used for insertion as a dummy quant matrix extension in the picture coding extension PCE area in FIG. 2C.

The signal detector 30 further has the following outputs as given below together with the signals that will be produced from the corresponding outputs.

quant_matrix_extension detect
A '1' signal is produced when a quant_matrix_extension signal '1' is detected.

picture_extension_end timing
A '1' signal is produced immediately after the end of the picture_coding_extension data.

sequence_header timing
A '1' signal is produced when the sequence_header signal is present.

intra_dc_precision_timing
A '1' signal is produced when the intra_dc_precision signal is present.

DCT coefficient timing
A '1' signal is produced when the DCT coefficient signal is present.

alternate_scan timing
A '1' signal is produced when the alternate_scan signal is present.

dct_type timing
A '1' signal is produced when the dct_type signal is present.

load_intra_quantiser_matrix
A '1' signal is produced from an inverting output when the load_intra_quantiser_matrix signal '0' is detected.

load_non_intra_quantiser_matrix
A '1' signal is produced from an inverting output when the load_non_intra_quantiser_matrix signal is '0' is detected.

load_intra_quantiser_matrix timing
A '1' signal is produced when the load_intra_quantiser_matrix signal is present.

load_non_intra_quantiser_matrix timing
A '1' signal is produced when the load_non_intra_quantiser_matrix signal is present.

The scramble position detector 1 also has AND gates 31, 32, 33, 34, 35, 43, 44, 47, 48, 49, 50, 52 and 53, OR gates 36, 37, 38, 51 and 54, inverters 40 and 42 and delays 45, 56 and 55.

The scramble position detector 1 further has two one-bit memories 39 and 41 for storing internal scramble flag signals f1 and f2, respectively. When the flag signal f1 is '1', it is indicated that no dummy intra_quantiser_matrix is inserted, but when it is '0', it is indicated that a dummy intra_quantiser_matrix is already inserted. Similarly, when the flag signal f2 is '1', it is indicated that no dummy non_intra_quantiser_matrix is inserted, but when it is '0', it is indicated that a dummy non_intra_quantiser_matrix is already inserted.

First Scramble Mode Operation

Under the first scramble mode, that is when sm1(0) is '1' (sm1(0)=00001), AND gates 43 and 44 are enabled. AND gate 44 produces a '1' signal when either one of AND gates 52 and 53 produced a '1' signal. When AND gate 52 produces a '1' signal, it is understood that the load_intra_quantiser_matrix signal is detected, meaning that no intra_quantiser_matrix is present. In this case, the '1' signal from AND gate 44 is transmitted through the delay 45 to the exclusive-OR gate 5, at which the load_intra_quantiser_matrix signal, which is '0' is inverted to load_intra_quantiser_matrix signal, which is '1'. Also, by the '1' signal (sequence_head_quantiser_matrix_flag) from the AND gate 44, multiplexer 69 selects one dummy data from memories 57–62 determined by the scramble pattern signal sm2. Then, switch 4 is turned to the dotted line position shown in FIG. 9B, and a signal stopping output from the buffer 2 is input to the buffer 2 so that the data is temporarily cumulated in buffer 2. Thus, the dummy data is inserted in the video signal following the load_intra_quantiser_matrix signal. Also, the '1' signal from AND gate 44 is send to the scramble information generator 46, informing that the dummy data insertion is effected at a particular location. Furthermore, the '1' signal from AND gate 52 is transmitted through OR gate 37 to memory 39 which thereupon sends out the old data '1', converts the old data '1' to '0' by inverter 40 and stores the new data '0', now indicating that the dummy data is stored for the intra_quantiser_matrix.

The same operation will be carried out in the case where the load_non_intra_quantiser_matrix is detected.

Similarly, AND gate 43 produces a '1' signal when AND gate 31 produces a '1' signal; that is when the picture_extension_end timing is detected and, at the same time, at least either one of the flag signal f1 or f2 is '1'. Then, immediately after the detection of the picture_extension_end timing, by the '1' signal (extension_quantiser_matrix_flag) from the AND gate 43, multiplexer selects one dummy data from memories 63-68 determined by the scramble pattern signal sm2. Then, switch 4 is turned to the position shown in FIG. 9B and the dummy data inserted in the video signal following the picture_extension_end timing as a dummy quant_matrix_extension signal. Also, the '1' signal from AND gate 43 is send to the scramble information generator 46, so that the data being produced at this moment from an output "temporal_reference" is stored in the scramble information generator 46 informing that the dummy data insertion is effected at a particular location. Furthermore, the '1' signal from AND gate 31 is transmitted through gates 34 and 37 to memory 39, and also through gates 35 and 38 to memory 41. Thus, the old data '1' in each of memories 39 and 41 is changed to new data '0'.

In the above example, the old data in memories 39 and 41 are always '1', because at the beginning, by the detection of the sequence header, the memories 39 and 41 are reset to carry '1'. Also, when the data in memories 39 and 41 are changed to data '0', the AND gates 32 and 33 are enabled by data '0' from memories 39 and 41. Then, when the true quant_matrix_extension signal is detected, the '1' signal from the quant_matrix_extension_detect is transmitted through AND gates 32 and 33 and further through OR gates 37 and 38 to memories 39 and 41. Thus, the data in memories 39 and 41 are returned to '1', ready for inserting a dummy data in the next cycle.

Second Scramble Mode Operation

Under the second scramble mode, that is when sm1(1) is '1' (sm1(0)=00010), AND gate 50 is enabled. In this case, upon detection of the dct_type signal, which may be '1' or '0', a timing signal '1' is produced from AND gate 50 and transmitted through OR gate 51 and delay 56 to exclusive-OR gate 5. Thus, the dct_type signal is inverted to '1' when its old state was '0', or to '0' when its old state was '1'.

Third Scramble Mode Operation

Under the third scramble mode, that is when sm1(2) is '1' (sm1(0)=00100), AND gate 49 is enabled. In this case, upon detection of the alternate_scan signal, which may be '1' or '0', a timing signal '1' is produced from AND gate 49 and transmitted through OR gate 51 and delay 56 to exclusive-OR gate 5. Thus, the alternate_scan signal is inverted to '1' when its old state was '0', or to '0' when its old state was '1'.

Fourth Scramble Mode Operation

Under the fourth scramble mode, that is when sm1(3) is '1' (sm1(0)=01000), AND gate 48 is enabled. In this case, upon detection of the DCT coefficient signal, which may be '1' or '0', a timing signal '1' is produced from AND gate 48 and transmitted through delay 55 to random number generator 7. Thus, the random number generator 7 generates a random number determined by the key data Ks (32 bit). The random number is added to the sign bit of the DCT coefficient, and the signal is scrambled. Thus, by the exclusive-OR gate 6, the bits in the DCT coefficient are randomly inverted.

Fifth Scramble Mode Operation

Under the fifth scramble mode, that is when sm1(4) is '1' (sm1(0)=10000), AND gate 47 is enabled. In this case, upon detection of the intra_dc_precision signal, which is a two-bit long signal, a timing signal '1' is produced from AND gate 47 and transmitted through OR gate 51 and delay 56 to exclusive-OR gate 5. Thus, the intra_-dc_precision signal is inverted, for example to '01' when its old state was '10'.

It is noted that when the scramble mode signal sm1 is 10001, this means that the first and the fifth scramble modes are selected and operated.

The scramble data Ks, sm1 and sm2 as generated by scramble data generator 100 are also sent, together with temporal_reference, to scramble information generator 46. The scramble information and the scramble video signal are sent to the receiver, such as to subscribers.

In general operation, the scramble position detector 1 outputs the scramble pattern signal sm2, dummy quantization matrix output start signal, and extended quantization matrix output start signal to the dummy pattern generator 3; and outputs at the scrambling timing to the random number generator 7 a scrambling timing signal whereby the scrambling key Ks is set as the initial value for random number generation. A signal telling the switch 4 to switch to the output from the buffer 2 is output to the switch 4; and a value of zero (0) is normally output to the exclusive-OR gate 5 so that no inversion is effected at the exclusive-OR gate 5.

The dummy pattern generator 3 stores the dummy quantization matrix patterns shown in FIGS. 4A-4F. When the dummy quantization matrix output start signal is input from the scramble position detector 1, the quantization matrix pattern specified by scramble pattern signal sm2 is output in the specified sequence. When the picture quantization matrix output start signal is input from the scramble position detector 1, the 'extension_start_code', 'extension_start_code_identifier', and the four quantization matrix patterns 'intra_quantizer_matrix', 'non_intra_quantizer_matrix', 'chroma_intra_quantizer_matrix', and 'chroma_non_intra_quantizer_matrix', and the respective one-bit codes indicating the presence of the respective quantization matrix signals are output according to the rules of the 'quant_matrix_extension'.

The operation of the scrambling apparatus shown in FIG. 1A and FIGS. 9A and 9B is described in detail below. In the operation, it is assumed that the input signal is a video signal conforming to MPEG CD13818, and is input to the scramble position detector 1 and the buffer 2.

(1) The scramble position detector 1 detects the sequence header code of the input signal, and sets f1 and f2 to '1'.

(2) When the LSB of scramble mode signal sm1 is '1', the 'load_intra_quantizer_matrix' signal in the sequence header is detected. When the load_intra_quantizer_matrix code is '0', AND gate 52 is enabled, and the bit corresponding to the load_intra_quantizer_matrix is inverted by the exclusive-OR gate 5 to '1', indicating that the intra_quantizer_matrix data follows in the video signal. Then, an output stop signal is output to the buffer 2, and the same output signal is applied to switch 4 to through-put the output from dummy pattern generator 3 for an 8×64 bit period. Also, the scramble pattern signal sm2 and dummy quantization matrix output start signal are output to the dummy pattern generator 3, and f1 is reset to '0'.

When the load_intra_quantizer_matrix code is '1', the operation is not executed, because the AND gate 52 will be disabled.

The load_non_intra_quantizer_matrix is similarly detected in the sequence header. When the load_non_intra_quantizer_matrix code is '0', the bit corresponding to the load_non_intra_quantizer_matrix is inverted by setting the output to the exclusive-OR gate 5 to '1'. Then, a signal for stopping the output is applied to the buffer 2, and the signal is also output to the switch 4 to through-put the output from the dummy pattern generator 3 for an 8×64 bit period. The scramble pattern signal sm2 and dummy quantization matrix output start signal are output to the dummy pattern generator 3, and f2 is reset to '0'.

When the load_non_intra_quantizer_matrix code is '1', this operation is not executed, because the AND gate 53 will be disabled.

(3) When the dummy pattern generator 3 receives the scramble pattern signal sm2 and dummy quantization matrix output start signal, the quantization matrix signal selected by the scramble pattern signal sm2 is output as an 8×64 bit signal in the specified sequence.

(4) When the LSB of the scramble mode signal sm1 is '1' and the quant_matrix_extension is detected, f1 and f2 are set to '1'.

(5) When the LSB of the scramble mode signal sm1 is '1', and f1 or f2 is '1', an output stop signal is sent to the buffer 2 from dummy pattern generator 3 at the beginning of the 'extension_and_user_data()' immediately following the next 'picture_coding_extension()', and a signal instructing the switch 4 to switch to the dummy pattern generator 3, as shown by a dotted line, is output from the dummy pattern generator 3 for a 2088-bit period.

The scramble pattern signal sm2 and dummy quantization matrix output start signal are input to the dummy pattern generator 3, setting f1 and f2 to '0' and storing the 'temporal_reference' of the inserted picture.

(6) When the dummy pattern generator 3 receives the scramble pattern signal sm2 and dummy quantization matrix output start signal, the quantization matrix signal from any one of memories 63–68 selected by the scramble pattern signal sm2 is output for a 2088-bit period according to the rules of the 'quant matrix extension'. (7) When bit 2 of sm1 is '1', i.e., when the second scramble mode is selected, the scramble position detector 1 detects the dct_type, and outputs a '1' to the exclusive-OR gate 5 at the timing whereby the dct_type bit is input to the exclusive-OR gate 5. (8) When bit 3 of sm1 is '1', i.e., when the third scramble mode is selected, the scramble position detector 1 detects the alternate_scan, and outputs a '1' to the exclusive-OR gate 5 at the timing whereby the alternate_-scan bit is input to the exclusive-OR gate 5.

(9) When bit 4 of sm1 is '1', i.e., when the fourth scramble mode is selected, the scramble position detector 1 detects the DCT coefficient sign bit, i.e., the sign bits in the 'subsequent_DCT_coefficient' and 'first_DCT_coefficient' in the ISO/IEC CD13818 signal format, and outputs the scrambling timing signal to the random number generator 7 at the timing the detected sign bit is input to the exclusive-OR gate 6.

The random number generator 7 outputs one bit based on the default state set by the scrambling key Ks, and an exclusive-OR operation is performed on the input data by the exclusive-OR gate 6.

(10) When bit 5 of sm1 is '1', i.e., when the fifth scramble mode is selected, the scramble position detector 1 detects the intra_dc_precision, and outputs a '1' to the exclusive-OR gate 5 at the timing whereby the intra_dc_-precision bit is input to the exclusive-OR gate 5.

(11) The process described in (2) and (3) above is repeated until the next sequence header is detected. When the next sequence header is detected, scramble mode signals sm1 and sm2, and the temporal_reference stored in process (5) above are output from the scramble position detector 1 according to the format shown in FIG. 5.

Note that in FIG. 5 the 'sequence_intra' is turned to '1' when a dummy data is inserted at the position where the intra_quantiser_matrix should be inserted in the sequence header, and turned to '0' if not; 'sequence_non_intra' is turned to '1' when a dummy data is inserted at the position where the non_intra_quantiser_matrix should be inserted in the sequence header, and turned to '0' if not; 'next_bit' is the value of the next bit; 'load_q_mat' is the one-bit signal indicating that a signal identifying the inserted position in the following signal is present; 'q_mat_temporal_reference' is the inserted temporal_reference value; and 'end_code' is a one-bit signal of value '0'.

By the process described above, the input signal is output from the exclusive-OR gate 5 as the scrambled signal specified by scramble mode signals sm1 and sm2.

Descrambling Apparatus

Figure 10:
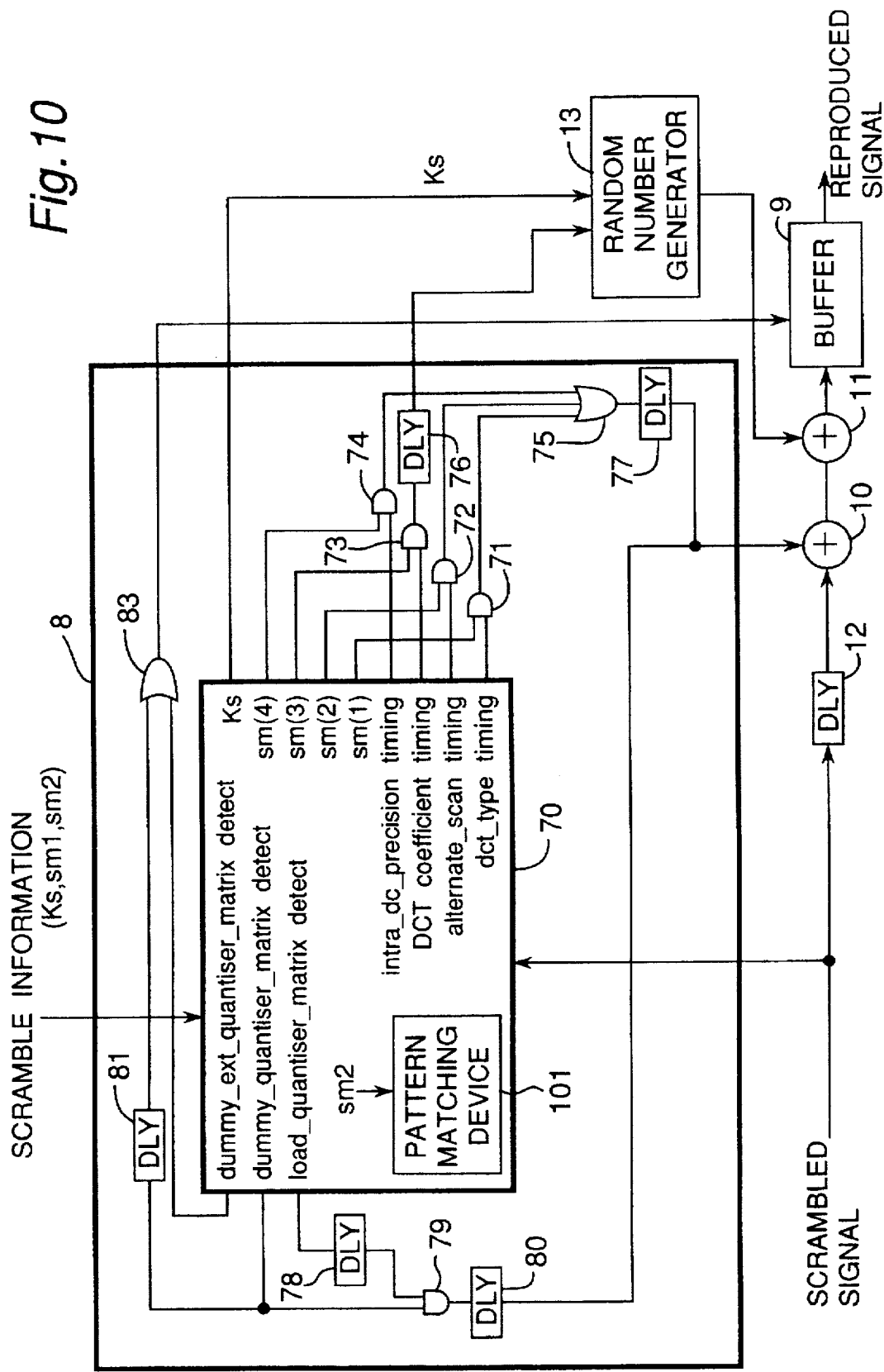
FIG. 10 shows a detail of the descrambling apparatus shown in FIG. 1B.

The signal processing apparatus on the reproduction side (the descrambling apparatus) shown in FIGS. 1B and 10 is described next.

As shown in FIG. 1B, the descrambling apparatus generally comprise: a scramble position detector 8 for detecting the position to be processed in the input signal; a buffer 9 for temporarily storing and then outputting the data at the appropriate timing; exclusive-OR gates 10 and 11; random number generator 13; and a delay circuit 12.

As shown in FIG. 10, the scramble position detector 8 comprises a signal detector 70 for detecting various signals in the scrambled MPEG video signal. The signal detector 70 receives the scrambled MPEG video signal as an input data and also scramble information for effecting the descrambling. According to the embodiment shown in FIG. 10, the scramble information includes key data Ks for selecting a number for the random number generator 7, five-bit scramble mode signal sm1, and six-bit scramble pattern signal sm2. The key data Ks is produced from the signal detector 70 from a terminal "Ks" as in is. Also, the scramble mode signal sm1, particularly the second to the fifth bit thereof are output through terminals "sm1(1)", "sm1(2)", "sm1(3)", "sm1(4)", respectively. The first bit of the scramble mode signal sm1 is used in the signal detector 70 for detecting the dummy data, by a pattern matching effected in a pattern matching device 101.

The signal detector 70 further has the following outputs as given below together with the signals that will be produced from the corresponding outputs.

dummy_ext_quant_matrix detect

A '1' signal is produced when a dummy of a quant_matrix_extension data is detected, and continues to produce '1' for a period equal to 2088 bits.

dummy_quantiser_matrix detect

A '1' signal is produced when a dummy of a quantiser_matrix data in the sequence header is detected, and continues to produce '1' for a period equal to 512 bits.

load_quantiser_matrix detect

A '1' signal is produced when a load_quantiser_matrix signal '1' in the sequence header is detected.

intra_dc_precision_timing

A '1' signal is produced when the intra_dc_precision signal is present.

DCT coefficient timing

A '1' signal is produced when the DCT coefficient signal is present.

alternate_scan timing

A '1' signal is produced when the alternate_scan signal is present.

dct_type timing

A '1' signal is produced when the dct_type signal is present.

The scramble position detector 8 further comprises AND gates 71, 72, 73, 74 and 79, OR gates 75 and 83, and delays 76, 77, 80 and 81. Each of the delays 76 and 77, as well as delay 12, delays 2087 bits; delay 80 delays 1575 bits; delay 81 delays 1576 bits; and 78 delays 512 bits.

The scrambled signal and scramble information output by the scramble position detector 1 according to FIG. 5 are input to the scramble position detector 8, which outputs a signal controlling the input to the exclusive-OR gate 11 and buffer 9. It is to be noted that the scramble information and scrambled signal may be multiplex transmitted, or may be transmitted by another apparatus with or without using cryptography.

The scrambled signal is input to the delay circuit 12 and signal detector 70. The signal input to the delay circuit 12 is applied to the exclusive-OR gate 10 for an exclusive-OR operation with the output from the scramble position detector 8. The output from exclusive-OR gate 10 is applied to the exclusive-OR gate 11 for an exclusive-OR operation with the random number generated by the random number generator 13 according to the scrambling timing output from the scramble position detector 8, and the result is applied to the buffer 9 at a constant rate.

The scramble position detector 8 reads the scramble mode signal sm1 and scramble pattern signal sm2 from the scramble information. When the LSB of sm1 is '1', that is when the first scramble mode is being selected, the quantization matrix of the scrambled signal is detected. When the detected quantization matrix matches the quantization matrix pattern indicated by scramble pattern signal sm2 in the pattern matching device 101, the bit immediately preceding the detected quantization matrix pattern in the sequence header is inverted by resetting the output to the exclusive-OR gate 10 to '1', and a control signal is input to the buffer 9 to stop data reading by the buffer 9 from the exclusive-OR gate 11 for the quantization matrix period. Timing can be obtained from the delay circuit 12 at this time so that the desired bit of the input signal can be bit inverted. When the detected quantization matrix is intra-picture, this signal is output to the buffer 9 for the period of the entire 'quant_matrix_extension' containing that quantization matrix, and data reading from the exclusive-OR gate 11 by the buffer 9 is stopped. As a result, the output from the buffer 9 becomes a signal from which the dummy quantization matrix pattern has been removed.

When bit 2 of the scramble mode signal sm1 is '1', that is when the second scramble mode is being selected, the scramble position detector 8 detects the dct_type, and inverts the dct_type bit by sending a '1' signal through AND gate 71, OR gate 75 and delay 77 to the exclusive-OR gate 10.

When bit 3 of the scramble mode signal sm1 is '1', that is when the third scramble mode is being selected, the scramble position detector 8 detects the alternate_scan, and inverts the alternate_scan bit by sending a '1' signal through AND gate 72, OR gate 75 and delay 77 to the exclusive-OR gate 10.

When bit 4 of the scramble mode signal sm1 is '1', that is when the fourth scramble mode is being selected, the scramble position detector 8 detects the DCT coefficient sign bit, and sends the scrambling timing signal through AND gate 73 and delay 76 to the random number generator 13. The random number generator 13 outputs one bit to the exclusive-OR gate 11, which executes an exclusive-OR operation on the DCT coefficient bit with the random number from the random number generator 13.

When bit 5 of the scramble mode signal sm1 is '1', that is when the fifth scramble mode is being selected, the scramble position detector 8 detects the intra_dc_precision, and inverts the intra_dc_precision bit by sending a '1' signal through AND gate 74, OR gate 75 and delay 77 to the exclusive-OR gate 10 for two bit periods. The output from the buffer 9 is thus reproduced identically to the original video signal.

By thus setting the scramble mode signal sm1 and scramble pattern signal sm2 by scramble data generator 100 in the scramble position detector 1, it is possible to insert the desired quantization matrix pattern in the bit stream; bit-invert the dct_type, alternate_scan, and intra_dc_precision signals; scramble the DCT coefficient sign bits; and simultaneously execute these combined processes.

Specifically, when scramble mode signal sm1 is '000001' in binary code indicating that the first scramble mode sm1(0) is selected, and scramble pattern signal sm2 is '100000' in binary code indicating that the scramble pattern sm2-6 (FIG. 4F) is selected, the quantization width of the AC component will be smaller than the actual value, and a mosaic scrambled image will result.

When scramble mode signal sm1 is 00001, indicating that the first scramble mode sm1(0) is selected, and scramble pattern signal sm2 is 000001 or 000100 in binary code, the quantization width of one component in one line component will be increased. If the scramble pattern signal sm2 is 000010 or 001000, the quantization width of one component in one column component will be increased; and if scramble pattern signal sm2 is 010000, column 2 of line 1 and column 1 of line 2 will be emphasized.

Furthermore, if scramble mode signal sm1 is 00011 in binary code and scramble pattern signal sm2 is 100000 in binary code, the size of the mosaic of the mosaic image from quantization matrix insertion will be doubled in the vertical direction, resulting in a mosaic scrambled image of 8 pixels in the horizontal direction and 16 pixels in the vertical direction. This is described further below.

Figure 6A:
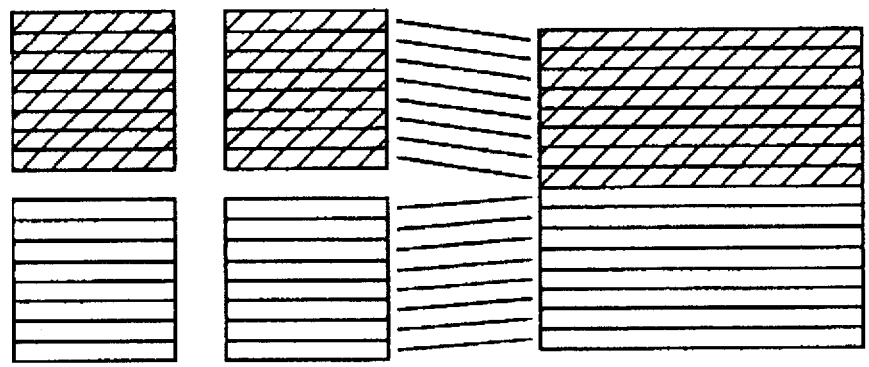
FIGS. 6A and 6B are diagrams showing the effect of dct_type bit inversion.
Figure 6B:
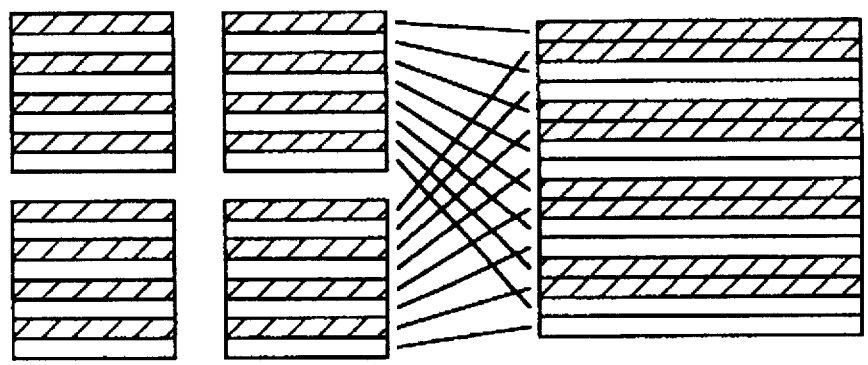

When scramble mode signal sm1 and scramble pattern signal sm2 are set as above, the dct_type is inverted. If the data is then decoded without correctly executing the reproduction-side process, the field and frame processes will not be correctly executed, and the image will be incorrectly reproduced. FIGS. 6A and 6B are used below to describe what happens when the image is reproduced mistaking the frame process for the field process, and when reproduced mistaking the field process for the frame process. As described with reference to FIG. 5, the image will be reproduced with the pixels in the wrong positions through a 16×8 pixel area, and the quantization-matrix-inserted mosaic scrambled image will be effectively reproduced to a mosaic of the size of two vertical blocks.

When sm1 is 01001 and sm2 is 100000, the effect of scrambling with the DCT coefficient sign bit virtually eliminates the effect of inserting the quantization matrix on the image, and the scrambled image will be essentially the same as though the value of the scramble mode signal sm1 was 00001. While unauthorized decoding may be attempted, only a DCT coefficient sign bit scrambled image will be obtained even if the inserted quantization matrix is removed, and protection against unauthorized decoding can be improved.

It is to be noted that the quantization matrices are described as fixed patterns as shown in FIGS. 2A–2E in this embodiment, but the same effect can be expected if the frequency component to be emphasized is several times the normal value, or, conversely, if the component that is to have no effect on the reproduced image is the inverse of several times the normal value.

In addition, two types of information, the scramble pattern signal sm2 encoding the inserted pattern and the location information using sequence_intra, sequence_non_intra, and q_mat_temporal_references, are generated and transmitted as the information for discriminating the inserted quantization matrix on the reproduction side, but it is also possible to provide the reproduction side with a reproducible signal by generating and transmitting to the reproduction side only one of these.

Furthermore, the signal processing apparatus on the reproduction side (the descrambling apparatus) of this embodiment detects the inserted pattern and the inserted position based on scramble pattern signal sm2, but it is also possible to detect the inserted position based on the temporal_reference signal of the inserted position.

Figure 11:
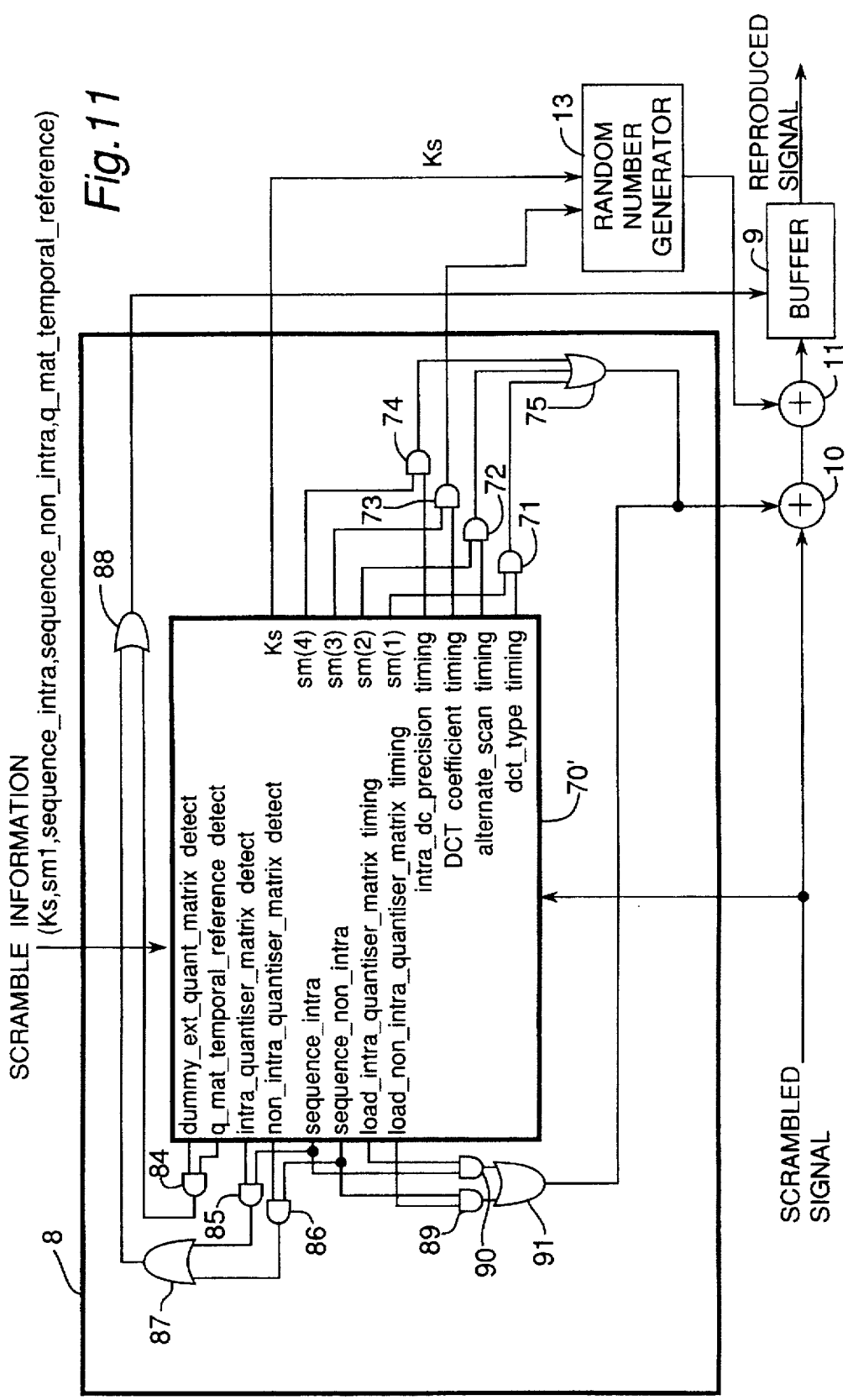
FIG. 11 shows a detail of the descrambling apparatus which is a modification of FIG. 10.

Specifically, the descrambling apparatus (reproduction side of the signal processing apparatus) can be revised as shown in FIG. 11. A signal detector 70' receives the following scramble information: Ks, sm1, sequence_intra, sequence_non_intra, and q_mat_temporal_reference.

Also, the signal detector 70' further has the following additional outputs as given below together with the signals that will be produced from the corresponding outputs.

q_mat_temporal_reference detect

A '1' signal is produced while a picture assigned with the same temporal_reference as the q_mat_temporal_reference in the received scramble information.

intra_quantiser_matrix detect

A '1' signal is produced when an intra_quantiser_matrix data in the sequence header is detected, and continues to produce '1' for a period equal to 512 bits.

non_intra_quantiser_matrix detect

A '1' signal is produced when a non_intra_quantiser_matrix data in the sequence header is detected, and continues to produce '1' for a period equal to 512 bits.

dummy_ext_quant_matrix detect

A '1' signal is produced when a quant_matrix_extension data is detected, and continues to produce '1' for a period equal to 2088 bits.

sequence_intra

A '1' signal is produced when a sequence_intra carrying a value '1' is received in the scramble information.

sequence_non_intra

A '1' signal is produced when a sequence_non_intra carrying a value '1' is received in the scramble information.

load_intra_quantiser_matrix timing

A '1' signal is produced when a load_intra_quantiser_matrix signal in the sequence header is '1'.

load_non_intra_quantiser_matrix timing

A '1' signal is produced when a load_non_intra_quantiser_matrix signal in the sequence header is '1'.

Furthermore, the signal detector 70' further has AND gates 84, 85, 86, 87, 89 and 90, and OR gates 88 and 91.

In operation, when the LSB of the scramble mode signal sm1 is '1', i.e., when the first scramble mode is being selected, the scramble position detector 8 receives the scramble information input in the format shown in FIG. 5. When the sequence_intra in the scramble information is '1', the intra_quantiser_matrix in the sequence header will be detected and removed. When the sequence_non_intra in the scramble information is '1', the non_intra_quantiser_matrix in the sequence header will be detected and removed. Also, the quantization matrix in the temporal_reference specified by the 'q_mat_temporal_reference' signal in the input signal is detected as a signal to be removed, and the process described below for removing this signal is executed as described in the above embodiment. By this detection, it is not necessary for the reproduction side to store the inserted patterns for scramble pattern signal sm2 as shown in FIGS. 4A–4F, and the reception-side process can be simplified.

In addition, the intra_dc_precision, alternate_scan, and dct_type codes are processed by a simple, regular bit inversion, but it is also possible to use random bit inversion control. This can be easily achieved by applying the same process applied to the DCT coefficient to these three codes.

Figure 7:
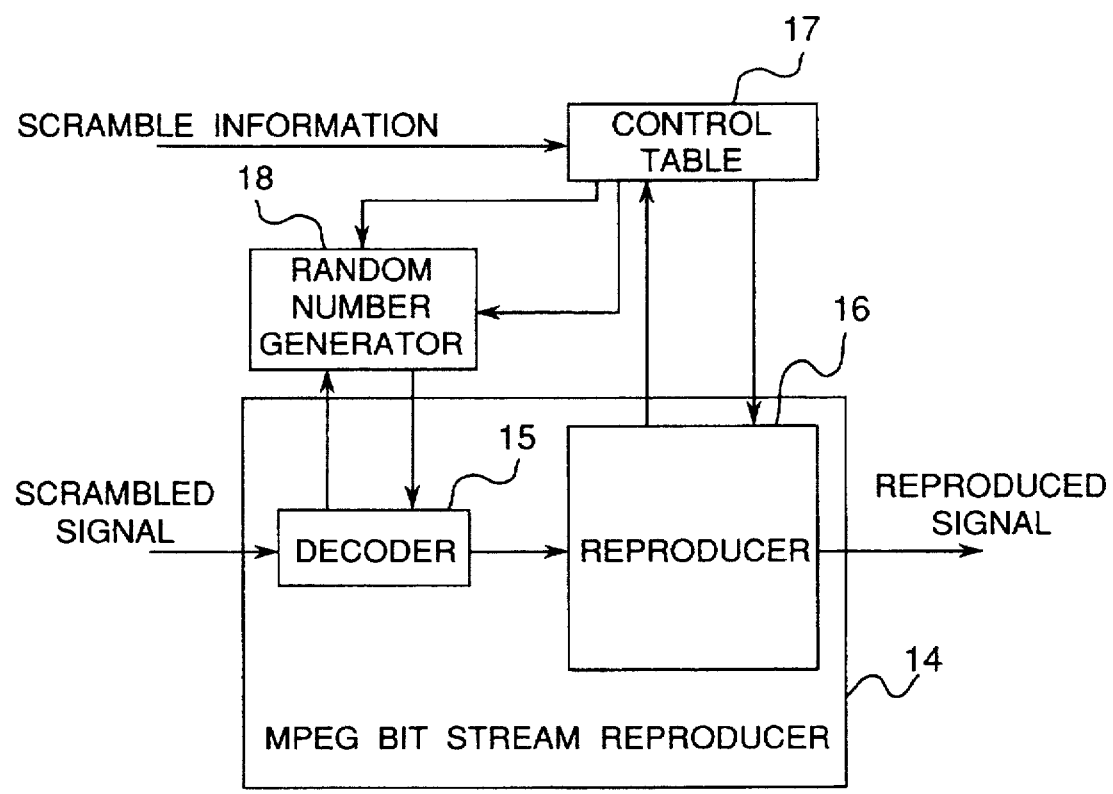
FIG. 7 is a block diagram of a video signal reproducing apparatus according to a second embodiment of the invention.

FIG. 7 is a block diagram of a video signal reproduction apparatus according to a second embodiment of the invention. The signal processing apparatus of this embodiment reproduces the scrambled signal generated by the signal processing apparatus of the first embodiment. As shown in FIG. 7, this reproducing apparatus comprises an MPEG bit stream reproducer 14, control table 17, and random number generator 18.

The MPEG bit stream reproducer 14 comprises a decoder 15 for decoding the codes of the signal conforming to the MPEG standard; and a reproducer 16 for reproducing each pixel of the source video signal from the decoded data input from the decoder 15.

The operation of the signal processing apparatus thus comprised is described below.

The scrambled signal is input to the MPEG bit stream reproducer 14 to the decoder 15, which decodes each internal code thereof and outputs to the reproducer 16. The scrambling-related information is input to the control table 17, and the scramble mode signal sm1 and scramble pattern signal sm2, and the q_mat_temporal_reference are stored. The scrambling key Ks is also input to the random number generator 18, and if bit 4 of scramble mode signal sm1 is '1', a scramble ON signal is also input to the random number generator 18. The random number generator 18 operates effectively only when the scramble ON signal is input thereto, and otherwise always outputs a 0 logic value.

When the scrambling timing signal is received from the decoder 15, the random number generator 18 outputs a one-bit signal in the random number string to the decoder 15. When the decoder 15 decodes the DCT coefficient code, it sends the scrambling timing signal to the random number generator 18, and receives one bit in the random number string back from the random number generator 18. This is decoded to the sign bit by an exclusive-OR operation.

The reproducer 16 in the MPEG bit stream reproducer 14 then reproduces the data output from the decoder 15. To do this, it reads scramble mode signal sm1; when the LSB of sm1 is '1', the reproducer 16 reads scramble pattern signal sm2 from the control table 17, recognizes the quantization matrix pattern indicated by sm2, and ignores the quantization matrix in the scrambled signal of the same recognition pattern. More specifically, when the reproducer 16 receives from the decoder 15 a quantization matrix identical to the recognized quantization matrix pattern, it ignores and does not use that value for reproduction processing, and continues reproduction processing using the same quantization matrix pattern used to that point.

When bit 2 of scramble mode signal sm1 is '1', frame processing is used for reproduction processing if the information relating to the dct_type from the decoder 15 is for field processing; if the information relating to the dct_type from the decoder 15 is for frame processing, field processing is used for reproduction processing.

When bit 3 of scramble mode signal sm1 is '1', zigzag scan reproduction processing is applied if the input from the decoder 15 indicates alternate_scan processing; if zigzag scan is indicated, alternate_scan reproduction processing is used.

When bit 5 of scramble mode signal sm1 is '1', reproduction processing assumes bit inversion of the intra_dc_ precision signal.

Because descrambling simultaneously with video reproduction during processing by the MPEG bit stream reproducer 14 can be achieved using a control table 17 and changing part of the procedure of the reproduction apparatus according to the present embodiment, the scale of the required apparatus can be significantly reduced relative to the scale of the descrambling apparatus on the reproduction side of the apparatus shown in FIG. 1 when the process for descrambling and MPEG bit stream reproduction is considered. It is to be noted that the same effect can be achieved by means other than the present embodiment by sharing the detection means for the codes in the scrambled signal and the decoding means for video reproduction.

Figure 8A:
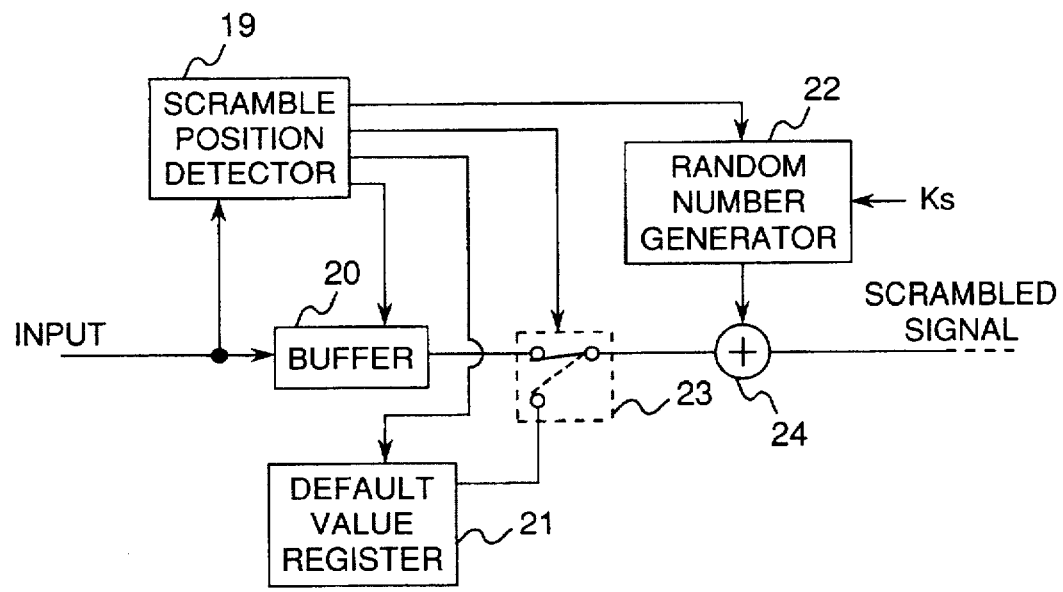
FIGS. 8A and 8B are block diagrams of a scrambling apparatus and descrambling apparatus, respectively, according to a third embodiment of the invention.
Figure 8B:
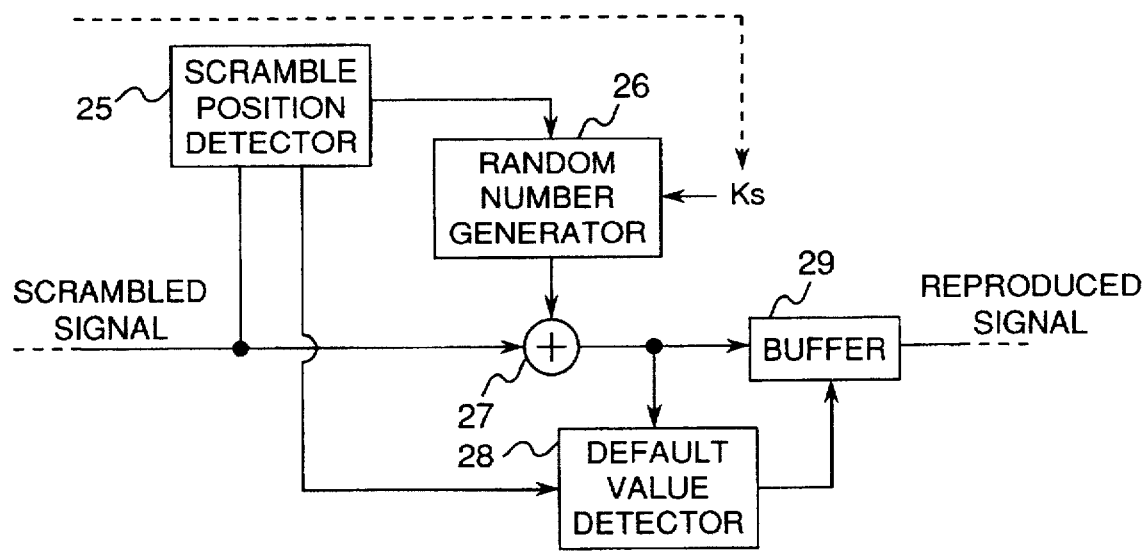

FIGS. 8A and 8B are block diagrams of a scrambling apparatus and a descrambling apparatus according to a third embodiment of the invention. As shown in FIGS. 8A and 8B, these scrambling and descrambling apparatuses each respectively comprise a scramble position detector 19 and 25 for detecting the scrambled position; a buffer 20 and 29 for temporarily storing and then outputting the data at the appropriate timing; a random number generator 22 and 26; and an exclusive-OR gate 24 and 27.

The scrambling apparatus of FIG. 8A further comprises a default value register 21 for storing the default value of the quantization matrix; and a switch 23 for outputting the signal from either the buffer 20 or the default value register 21.

The descrambling apparatus of FIG. 8B further comprises a default value register 28 for detecting whether the quantization matrix value matches the default value.

The scrambling key is applied as the same value to the random number generators 22 and 26. The scrambling key may be transmitted multiplexed, such as in a time sharing manner, to the scrambled signal, or by any other means.

The input source signal is input to the scramble position detector 19 and the buffer 20 of the scrambling apparatus. The buffer 20 through-puts the input signal to the switch 23 according to the output control signal from the scramble position detector 19. The output command is normally maintained by source signals other than the signal relating to the quantization matrix, and the control signal to the buffer 20 is output through the switch 23 and exclusive-OR gate 24 without processing. Signals relating to the quantization matrix are processed as follows.

The scramble position detector 19 reads the load_intra_ quantizer_matrix in the sequence header of the source signal. If the load_intra_quantizer_matrix is '1', the output signal to the buffer 20 is maintained so that all subsequent source signals are output from the buffer 20; a control signal is applied to the switch 23 so that the buffer output signal is output from the switch 23; and the random number output signal is applied to the random number generator 22.

When the random number generator 22 receives the random number output signal, it generates a 512-bit random number string, and adds the string sequentially to the intra_ quantizer_matrix following the load_intra_quantizer_ matrix through the exclusive-OR gate 24.

When the load_intra_quantizer_matrix value is '0', the intra_quantizer_matrix code is not in the source signal. The scramble position detector 19 therefore outputs a signal to temporarily stop buffer output; sends an output command to the default value register 21 to output the default value of the 512-bit intra_quantizer matrix; and outputs a control signal to switch the switch 23 to the default value register side. The random number output signal and a signal indicating that the load_intra_quantizer_matrix value is '0' are also output to the random number generator 22.

When the random number generator 22 receives these signals, it sends a '1' to the exclusive-OR gate 24 to invert the load_intra_quantizer_matrix bit, and generates a 512-bit random number string sequentially added to the intra_ quantizer_matrix following the load_intra_quantizer_ matrix through the exclusive-OR gate 24. After the 512-bit data is output, the normal state is reset, output from the buffer 20 resumes, the random number generator 22 outputs '0', and the input signal is output without being processed.

The scramble position detector 19 next reads the load_ non_intra_quantizer_matrix. If the load_non_intra_ quantizer_matrix value is '1', the output signal to the buffer 20 is maintained so that all subsequent source signals are output from the buffer 20; a control signal is applied to the switch 23 so that the buffer output signal is output from the switch 23; and the random number output signal is applied to the random number generator 22.

When the random number generator 22 receives the random number output signal, it generates a 512-bit random number string, and adds the string sequentially to the non_ intra_quantizer_matrix following the load_non_intra_ quantizer_matrix through the exclusive-OR gate 24.

When the load_non_intra_quantizer_matrix value is '0', the non_intra_quantizer_matrix code is not in the source signal. The scramble position detector 19 therefore outputs a signal to temporarily stop buffer output; sends an output command to the default value register 21 to output the default value of the 512-bit non_intra_quantizer_matrix; and outputs a control signal to switch the switch 23 to the default value register side. The random number output signal and a signal indicating that the load_non_intra_ quantizer_matrix value is '0' are also output to the random number generator 22.

When the random number generator 22 receives these signals, it sends a '1' to the exclusive-OR gate 24 to invert the load_non_intra_quantizer_matrix bit, and generates a 512-bit random number string sequentially added to the non_intra_quantizer_matrix following the load_non_ intra_quantizer_matrix through the exclusive-OR gate 24. After the 512-bit data is output, the normal state is reset, output from the buffer 20 resumes, the random number generator 22 outputs '0', and the source signal is output without being processed.

By means of this process, a scrambled signal is obtained containing a haphazard value obtained by adding a random number to the quantization matrix value by an exclusive-OR operation when a quantization matrix is part of the source signal, and a haphazard value obtained by adding a random number to the default value by an exclusive-OR operation when a quantization matrix is not part of the source signal.

At the descrambling apparatus side, the scramble position detector 25 first detects the intra_quantizer_matrix and the non_intra_quantizer_matrix, and sends a random number output signal to the random number generator 26.

The random number generator 26 is a random number generator for generating the same string as the random number generated by the random number generator 22 for scrambling. When the signal from the scramble position detector 25 is received, the random number generator 26 generates a random number for the following 512 bits, and adds the random numbers through the exclusive-OR gate 27. The signals to which the random numbers are added are input to the buffer 29 and the default value register 28.

The default value register 28 receives from the scramble position detector 25 a signal which indicates that the bit identifying the quantization matrix has appeared; compares the following 512-bit signal with the default value; and outputs a 'matches default value signal' to the buffer 29 if they match.

When the 'matches default value signal' is input to the buffer 29, the buffer 29 internally destroys the bit equivalent to the quantization matrix, and inverts each bit of the load_intra_quantizer_matrix and the load_non_intra_quantizer_matrix. After accumulating sufficient data to sustain output at a constant bit rate, the data is sequentially output as the reproduction signal.

By the present embodiment, when a quantization matrix signal is not included in the source signal, the result of the exclusive OR taken between the default value and a random number is inserted to the signal. On the reproduction side, when decoding the scrambled signal using the same random number, the presence of a quantization matrix in the source signal can be determined by confirming whether there is a match with the default value; if there was originally no quantization matrix in the source signal, that signal can be deleted, and the source signal and reproduced signal after descrambling is completed will match. As a result, in the decompression process that can be expected to follow thereafter, operational errors caused by, for example, changes in the bit length can be prevented.

It is to be noted that both the intra_quantizer_matrix and the non_intra_quantizer_matrix are scrambled in the above embodiment, but it is also possible to scramble only one.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A scrambling system comprising a scrambling apparatus for scrambling a compression-coded digital video signal to output a scrambled digital video signal and a descrambling apparatus for descrambling the scrambled digital video signal to output the compression-coded digital video signal, said scrambling apparatus comprising:
  signal insertion means for inserting into the compression-coded digital video signal a signal identifying a quantization width at which an original video signal has been quantized into the compression-coded digital video signal to obtain the scrambled digital video signal; and said descrambling apparatus comprising:
  removing means for removing from the scrambled digital video signal the signal inserted into the compression-coded digital video signal by said signal insertion means.

2. A scrambling system comprising a scrambling apparatus for scrambling a compression-coded digital video signal to output a scrambled digital video signal and a descrambling apparatus for descrambling the scrambled digital video signal to output the compression-coded digital video signal, said scrambling apparatus comprising:
  detecting means for detecting a predetermined position in said compression-coded digital video signal;
  dummy generation means for generating a dummy data which does not form an original part of said compression-coded digital video signal; and
  insertion means for inserting said dummy data at said predetermined position in said compression-coded digital video signal to obtain said scrambled digital video signal; and said descrambling apparatus comprising:
  dummy detection means for detecting said dummy data in said scrambled digital video signal; and
  removing means for removing the detected dummy data from said scrambled digital video signal to obtain said compression-coded digital video signal.

3. A scrambling system according to claim 2, wherein said descrambling apparatus further comprises detecting means for detecting a predetermined position in said scrambled digital video signal.

4. A scrambling system according to claim 2, wherein said scrambling apparatus further comprises:
  detecting means for detecting in said compression-coded digital video signal a predetermined code selected from a group of a first code identifying which one of a field processing and a frame processing is used in an orthogonal transform coded video signal, a second code identifying a coefficient of a DC component in the coefficient components after orthogonal transform coding in the orthogonal transform coded video data, and a third code identifying a scanning method when a DCT coefficient is coded by two-dimensional Huffman coding; and
  inversion means for inverting said detected predetermined code in said compression-coded video signal to obtain said scrambled digital video signal; and
  wherein said descrambling apparatus further comprises:
    detection means for detecting said inverted predetermined code in said scrambled digital video signal; and
    means for restoring said inverted predetermined code back to an original non-inverted state to obtain the compression-coded digital video signal.

5. In a scrambling system comprising a scrambling apparatus for scrambling a compression-coded digital video signal to output a scrambled digital video signal and a descrambling apparatus for descrambling the scrambled digital video signal to output the compression-coded digital video signal, said scrambling apparatus comprising:
  detecting means for detecting a predetermined position in said compression-coded digital video signal;
  dummy generation means for generating a dummy data which does not form an original part of said compression-coded digital video signal; and
  insertion means for inserting said dummy data at said predetermined position in said compression-coded digital video signal to obtain said scrambled digital video signal.

6. A scrambling apparatus according to claim 5, wherein said dummy signal identifies a quantization width at which an original video signal has been quantized into the compression-coded digital video signal.

7. A scrambling apparatus according to claim 5, wherein said insertion means processes and inserts a signal identifying a quantization width at which an original video signal has heed quantized for each coefficient component in resultant orthogonal transform coded video data.

8. A scrambling apparatus according to claim 7, wherein the insertion means inserts a code identifying a quantization width of a coefficient component identifying an AC component in an orthogonal transform coded video data as a code identifying a value which is smaller than the quantization width value at which an original video signal has been quantized into the compression-coded digital video signal.

9. A scrambling apparatus according to claim 8, wherein the insertion means inserts a quantization matrix in the compression-coded digital video signal which conforms to the MPEG standard.

10. A scrambling apparatus according to claim 9, wherein the insertion means inserts a quantization matrix of which all components other than the component in line one and column one of the quantization matrix have a value of one.

11. A scrambling apparatus according to claim 9, wherein the insertion means processes and inserts to the predetermined position in the compression-coded digital video signal a quantization matrix code wherein:

any one component in line one other than the component at line one and column one identifying the quantization width of a high frequency signal of a horizontal component of the quantization matrix of the MPEG-standard video signal, and any one component in column one identifying the quantization width of a high frequency component of a vertical component having a value which is greater than an actual coding quantization width at which an original video signal has been quantized into the compression-coded digital video signal; and the other high frequency components have a value which is smaller than said actual coding quantization width.

12. A scrambling apparatus according to claim 11, wherein the insertion means processes and inserts to the predetermined position in the compression-coded digital video signal a quantization matrix code wherein:

the component at line two and column one identifying the quantization width of the first order high frequency component of a vertical component of the quantization matrix of the MPEG-standard video signal, and the component at line one and column two identifying the quantization width of the first order high frequency component of a horizontal component, have a value which is greater than an actual coding quantization width at which an original video signal has been quantized into the compression-coded digital video signal; and the high frequency components other than the component at line one and column one have a value which is smaller than said actual coding quantization width.

13. A scrambling apparatus according to claim 5, wherein said insertion means inserts a selected quantization matrix code in said compression-coded digital video signal which conforms to the MPEG standard.

14. A scrambling apparatus according to claim 5, wherein the insertion means scrambles a quantization matrix code already present in the compression-coded digital video signal as an inserting pattern.

15. A scrambling apparatus according to claim 5, wherein the insertion means processes and inserts to the predetermined position in the compression-coded digital video signal a quantization matrix code wherein:

any one component in line one other than the component at line one and column one of the quantization matrix of the MPEG-standard video signal has a value greater than the actual coding quantization width at which an original video signal has been quantized into the compression-coded digital video signal; and the other high frequency components have a value which is smaller than said actual coding quantization width.

16. A scrambling apparatus according to claim 15, wherein the insertion means processes and inserts to the predetermined position in the compression-coded digital video signal a quantization matrix code wherein:

the component of line one and column two identifying the quantization width of a first order high frequency signal of a horizontal component of the quantization matrix of the MPEG-standard video signal has a value which is greater than an actual coding quantization width at which an original video signal has been quantized into the compression-coded digital video signal; and the other high frequency components have a value which is smaller than said actual coding quantization width.

17. A scrambling apparatus according to claim 16, wherein the insertion means inserts a quantization matrix code wherein:

the value of the component of line one and column two is 255; and the value of all components other than the components at line one and column two and at line one and column one is one.

18. A scrambling apparatus according to claim 15, wherein the insertion means processes and inserts to the predetermined position in the compression-coded digital video signal a quantization matrix code wherein:

the component of line one add column three identifying the quantization width of a second order high frequency signal of a horizontal component of the quantization matrix of the MPEG-standard video signal has a value which is greater than an actual coding quantization width at which an original video signal has been quantized into the compression-coded digital video signal; and the other high frequency components have a value which is smaller than said actual coding quantization width.

19. A scrambling apparatus according to claim 18, wherein the insertion means inserts a quantization matrix code wherein:

the value of the component at line one and column three is 255; and the value of all components other than the components at line one and column three and at line one and column one is one.

20. A scrambling apparatus according to claim 5, wherein the insertion means processes and inserts to the predetermined position in the compression-coded digital video signal a quantization matrix code wherein:

any one component in line one other than the component at line one and column one of the quantization matrix of the MPEG-standard video signal has a value which is greater than an actual coding quantization width at which an original video signal has been quantized into the compression-coded digital video signal; and the other high frequency components have a value which is smaller than said actual coding quantization width.

21. A scrambling apparatus according to claim 20, wherein the insertion means processes and inserts to the predetermined position in the compression-coded digital video signal a quantization matrix code wherein:

the component at line two and column one identifying the quantization width of a first order high frequency signal of a vertical component of the quantization matrix of the MPEG-standard video signal has a value which is greater than an actual coding quantization width at which an original video signal has been quantized into the compression-coded digital video signal; and the other high frequency components have a value which is smaller than said actual coding quantization width.

22. A scrambling apparatus according to claim 21, wherein the insertion means inserts a quantization matrix code wherein:

the value of the component at line two is and column one is 255; and the value of all components other than the components at line two and column one and at line one and column one is one.

23. A scrambling apparatus according to claim 20, wherein the insertion means processes and inserts to the predetermined position in the compression-coded digital video signal a quantization matrix code wherein:

the component at line three and column one identifying the quantization width of a second order high frequency signal of a vertical component of the quantization matrix of the MPEG-standard video signal has a value which is greater than an actual coding quantization width at which an original video signal has been quantized into the compression-coded digital video signal; and the other high frequency components have a value which is smaller than said actual coding quantization width.

24. A scrambling apparatus according to claim 23, wherein the insertion means inserts a quantization matrix code wherein:

the value of the component at line three and column one is 255; and the value of all components other than the components at line three and column one and at line one and column one is one.

25. A scrambling apparatus according to claim 5, wherein the insertion means comprises an insertion position information generating means for generating a code identifying the inserted position of a quantization matrix inserted by the insertion means.

26. A scrambling apparatus according to claim 25, wherein the insertion position information generating means generates as position information inserted by the insertion means, a signal indicating insertion in the sequence header when the quantization matrix code is inserted in the sequence header, and a value of a temporal_reference signal of the inserted signal when a quantization matrix code is inserted in the quant_matrix_extension.

27. A scrambling apparatus according to claim 5, wherein: the insertion means comprises pattern information generating means for generating a dummy data pattern of a quantization matrix code to be inserted by said insertion means.

28. A scrambling apparatus according to claim 5, further comprising:

detecting means for detecting in said compression-coded digital video signal a predetermined code selected from a group of a first code identifying which one of a field processing and a frame processing is used in an orthogonal transform coded video signal, a second code identifying a coefficient of a DC component in the coefficient components after orthogonal transform coding in the orthogonal transform coded video data, and a third code identifying a scanning method when a DCT coefficient is coded by two-dimensional Huffman coding; and inversion means for inverting said detected predetermined code in said compression-coded video signal to obtain said scrambled digital video signal.

29. A scrambling apparatus according to claim 5, further comprising:

detecting means for detecting a coefficient component in the orthogonal transform coded video signal; and scrambling means for scrambling the detected coefficient component.

30. A scrambling apparatus according to claim 29, wherein said scrambling means comprises:

random number generation means for generating a random number relative to said detected coefficient component; and inversion means for inverting said coefficient component based on said generated random number to obtain said scrambled digital video signal.

31. In a scrambling system comprising a scrambling apparatus for scrambling a compression-coded digital video signal to output a scrambled digital video signal and a descrambling apparatus for descrambling the scrambled digital video signal to output the compression-coded digital video signal, said descrambling apparatus comprising:

dummy detection means for detecting a dummy data which does not form an original part of said compression-coded digital video signal and inserted in said scrambled digital video signal; and removing means for removing the detected dummy data from said scrambled digital video signal to obtain said compression-coded digital video signal.

32. A descrambling apparatus according to claim 31, wherein the dummy detection means detects a quantization matrix code existing in a position identified by an inserted position information.

33. A descrambling apparatus according to claim 32, wherein the dummy detection means detects a pattern of the quantization matrix code identified by the pattern recognition code of the inserted quantization matrix code.

34. A descrambling apparatus according to claim 31, further comprising:

detecting means for detecting an inverted predetermined code in said compression-coded digital video signal, said inverted predetermined code selected from a group of a first code identifying which one of a field processing and a frame processing is used in an orthogonal transform coded video signal, a second code identifying a coefficient of a DC component in the coefficient components after orthogonal transform coding in the orthogonal transform coded video data, and a third code identifying a scanning method when a DCT coefficient is coded by two-dimensional Huffman coding; and means for restoring said inverted predetermined code back to an original non-inverted state to obtain the compression-coded digital video signal.

35. A descrambling apparatus for descrambling a scrambled digital video signal obtained scrambling a compressed video signal conforming to the MPEG standard having various codes, said descrambling apparatus comprising:

detecting means for denoting said various codes contained in said scrambled digital video signal;

reproducing means for reproducing said compressed video signal;

dummy detection means for detecting a dummy quantization matrix code inserted in said compression video signal; and means for inhibiting processing of said scrambled digital signal when said scrambled digital video signal matches said dummy quantization matrix code.

36. A scrambling system comprising a scrambling apparatus for scrambling a compression-coded digital video signal to output a scrambled digital video signal and a descrambling apparatus for descrambling the scrambled digital video signal to output the compression-coded digital video signal, said scrambling apparatus comprising:

detecting means for detecting in said compression-coded digital video signal a predetermined code selected from a group of a first code identifying which one of a field processing and a frame processing is used in an orthogonal transform coded video signal, a second code identifying a coefficient of a DC component in the coefficient components after orthogonal transform coding in the orthogonal transform coded video data, and a third code identifying a scanning method when a DCT coefficient is coded by two-dimensional Huffman coding; and inversion means for inverting said detected predetermined code in said compression-coded video signal to obtain said scrambled digital video signal; and said descrambling apparatus comprising:

detection means for detecting said inverted predetermined code in said scrambled digital video signal; and means for restoring said inverted predetermined code back to an original non-inverted state to obtain the compression-coded digital video signal.

37. A scrambling system comprising a scrambling apparatus for scrambling a compression-coded digital video signal to output a scrambling digital video signal and a descrambling apparatus for descrambling the scrambled video signal to output the compression-coded digital video signal, detecting means for detecting in said compression-coded digital video signal a predetermined code selected from a group of a first code identifying which one of a field processing and a frame processing is used in an orthogonal transform coded video signal, a second code identifying a coefficient of a DC component in the coefficient components after orthogonal transform coding in the orthogonal transform coded video data, and a third code identifying a scanning method when a DCT coefficient is coded by two-dimensional Huffman coding; and inversion means for inverting said detected predetermined code in said compression-coded video signal to obtain said scrambled digital video signal.

38. A scrambling system comprising a scrambling apparatus for scrambling a compression-coded digital video signal to output a scrambling digital video signal and a descrambling apparatus for descrambling the scrambled video signal to output the compression-coded digital video signal, detection means for detecting an inverted predetermined code in said scrambled digital video signal, said inverted predetermined code selected from a group of a first code identifying which one of a field processing and a frame processing is used in an orthogonal transform coded video signal, a second code identifying a coefficient of a DC component in a coefficient components after orthogonal transform coding in the orthogonal transform coded video data, and a third code identifying a scanning method when a DCT coefficient is coded by two-dimensional Huffman coding; and means for restoring said inverted predetermined code back to an original non-inverted state to obtain the compression-coded digital video signal.

* * * * *